(12) United States Patent
Raggio et al.

(10) Patent No.: US 10,212,716 B2
(45) Date of Patent: Feb. 19, 2019

(54) CHANNELIZATION FOR SIGNAL BOOSTERS

(71) Applicant: WILSON ELECTRONICS, LLC, St. George, UT (US)

(72) Inventors: Glen Raggio, Mesquite, TX (US); Chris Ashworth, St. George, UT (US); Patrick Cook, Cedar City, UT (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

(21) Appl. No.: 15/294,511

(22) Filed: Oct. 14, 2016

(65) Prior Publication Data
US 2017/0111161 A1    Apr. 20, 2017

Related U.S. Application Data

(60) Provisional application No. 62/241,640, filed on Oct. 14, 2015.

(51) Int. Cl.
| | |
|---|---|
| *H04W 72/08* | (2009.01) |
| *H04L 5/00* | (2006.01) |
| *H04L 5/14* | (2006.01) |
| *H04W 4/02* | (2018.01) |
| *H04W 72/04* | (2009.01) |
| *H04L 12/26* | (2006.01) |
| *H04W 24/08* | (2009.01) |
| *H04B 7/155* | (2006.01) |

(Continued)

(52) U.S. Cl.
CPC ...... *H04W 72/085* (2013.01); *H04B 7/15535* (2013.01); *H04B 7/15542* (2013.01); *H04L 5/005* (2013.01); *H04L 5/14* (2013.01); *H04L 43/16* (2013.01); *H04W 4/025* (2013.01); *H04W 24/08* (2013.01); *H04W 72/042* (2013.01); *H04W 72/0413* (2013.01); *H04W 88/04* (2013.01); *H04W 88/08* (2013.01)

(58) Field of Classification Search
None
See application file for complete search history.

(56) References Cited

U.S. PATENT DOCUMENTS

| | | |
|---|---|---|
| 4,776,032 A | 10/1988 | Odate et al. |
| 5,303,395 A | 4/1994 | Dayani |

(Continued)

FOREIGN PATENT DOCUMENTS

| | | |
|---|---|---|
| EP | 1525678 B1 | 7/2008 |
| WO | WO 2010056222 A1 | 5/2010 |

OTHER PUBLICATIONS

ADL5513; "1 MHz to 4 GHz, 80 dB Logarithmic Detector / Controller"; Data Sheet; (2008); 12 pages.

(Continued)

*Primary Examiner* — Bunjob Jaroenchonwanit
(74) *Attorney, Agent, or Firm* — Thorpe North & Western, LLP

(57) ABSTRACT

A technology is described for increasing signal booster while maintaining network protections. A distance from the signal booster to one or more base stations can be estimated. A base station coupling loss (BSCL) value can be calculated based on the estimated distance. A gain and/or a noise power of an uplink signal of the frequency band can be adjusted based on the BSCL value while maintaining network protections.

17 Claims, 23 Drawing Sheets

(51) Int. Cl.
*H04W 88/08* (2009.01)
*H04W 88/04* (2009.01)

(56) References Cited

U.S. PATENT DOCUMENTS

| | | | |
|---|---|---|---|
| 5,737,687 A | 4/1998 | Martin et al. | |
| 5,777,530 A | 7/1998 | Nakatuka | |
| 5,835,848 A | 11/1998 | Bi et al. | |
| 6,005,884 A * | 12/1999 | Cook | H04W 88/085 370/338 |
| 6,711,388 B1 | 3/2004 | Neitiniemi | |
| 6,889,033 B2 | 5/2005 | Bongfeldt | |
| 6,990,313 B1 | 1/2006 | Yarosky | |
| 7,035,587 B1 | 4/2006 | Yarosky | |
| 7,221,967 B2 | 5/2007 | Van Buren et al. | |
| 7,974,573 B2 | 7/2011 | Dean | |
| 8,049,664 B2 | 11/2011 | Millard et al. | |
| 8,816,904 B2 | 8/2014 | Raines et al. | |
| 2002/0044594 A1 | 4/2002 | Bongfeldt | |
| 2002/0170357 A1 | 11/2002 | Giordano et al. | |
| 2003/0123401 A1 | 7/2003 | Dean | |
| 2003/0236067 A1 | 12/2003 | Hasarchi et al. | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0019604 A1 | 1/2006 | Hasarchi | |
| 2006/0084379 A1 | 4/2006 | O'Neill | |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 * | 4/2008 | Van Buren | H04B 1/3877 455/11.1 |
| 2008/0274718 A1 * | 11/2008 | Roper | H04B 7/15507 455/411 |
| 2008/0278237 A1 | 11/2008 | Blin | |
| 2008/0293360 A1 | 11/2008 | Maslennikoy et al. | |
| 2008/0299896 A1 | 12/2008 | Mohebbi | |
| 2009/0075644 A1 * | 3/2009 | Hermel | H04B 1/0475 455/422.1 |
| 2009/0196215 A1 | 8/2009 | Sabat et al. | |
| 2010/0304751 A1 * | 12/2010 | Ji | H04L 1/02 455/450 |
| 2010/0311480 A1 | 12/2010 | Raines et al. | |
| 2011/0151775 A1 | 6/2011 | Kang et al. | |
| 2012/0243446 A1 * | 9/2012 | Mueller | H04B 1/0057 370/280 |
| 2013/0077502 A1 * | 3/2013 | Gainey | H04B 7/15578 370/252 |
| 2013/0329637 A1 * | 12/2013 | Kodali | H04W 76/046 370/328 |
| 2014/0011442 A1 * | 1/2014 | Dussmann | H04B 7/15535 455/10 |
| 2014/0127989 A1 | 5/2014 | Judd et al. | |
| 2014/0200015 A1 * | 7/2014 | Kweon | H04W 76/068 455/450 |
| 2015/0003254 A1 * | 1/2015 | Sasaki | H04W 28/08 370/237 |
| 2015/0067803 A1 * | 3/2015 | Alduaiji | G06F 21/31 726/7 |
| 2015/0382298 A1 * | 12/2015 | Muller | H04W 52/0212 370/311 |
| 2016/0044488 A1 * | 2/2016 | Kim | H04W 8/005 370/328 |
| 2016/0219565 A1 * | 7/2016 | Uchino | H04W 76/025 |
| 2016/0242191 A1 * | 8/2016 | Liao | H04L 43/16 |
| 2017/0027018 A1 * | 1/2017 | Langereis | H04W 72/042 |
| 2017/0223175 A1 * | 8/2017 | Abraham | H04M 1/72577 |
| 2017/0265133 A1 * | 9/2017 | Chandramouli | H04W 76/046 |

OTHER PUBLICATIONS

HMC713LP3E; "54 dB, Logarithmic Detector / Controller, 50—8000 MHz"; Data Sheet (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS FLASH Microcontrollers"; Data Sheet; (2001); 218 pages.

3GPP2 C.S0011-B; "Recommended Minimum Performance Standards for cdma2000® Spread Spectrum Mobile Stations"; TIA-98-E; (Dec. 13, 2002); 448 pages; Release B, Version 1, Revision E.

* cited by examiner

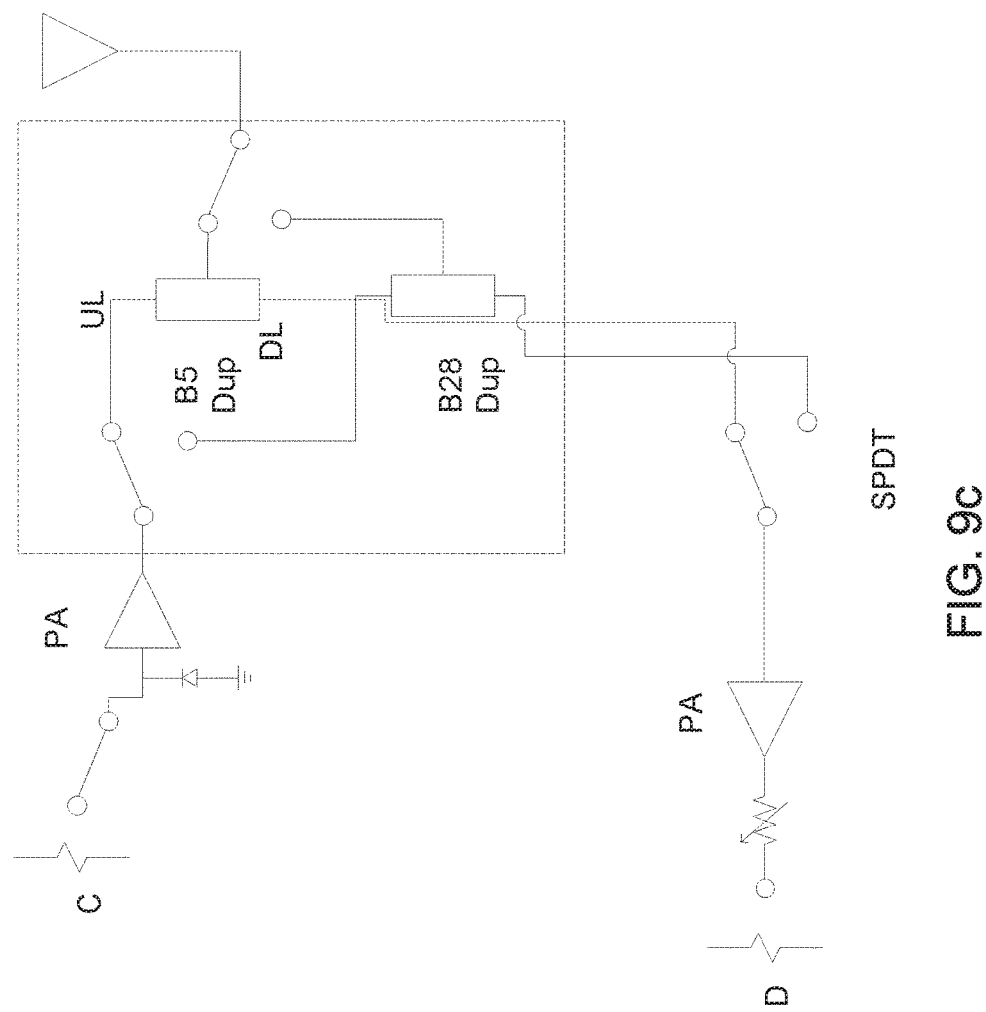

CHANNELIZATION FOR SIGNAL BOOSTERS

RELATED APPLICATIONS

The present application claims priority to U.S. Provisional Application No. 62/241,640 filed Oct. 14, 2015, the entire specification of which is hereby incorporated by reference in its entirety for all purposes.

BACKGROUND

Signal boosters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via the antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIGS. 9a-9c illustrates a dual-band, non-simultaneous channelized device in accordance with an example;

Figure 1:
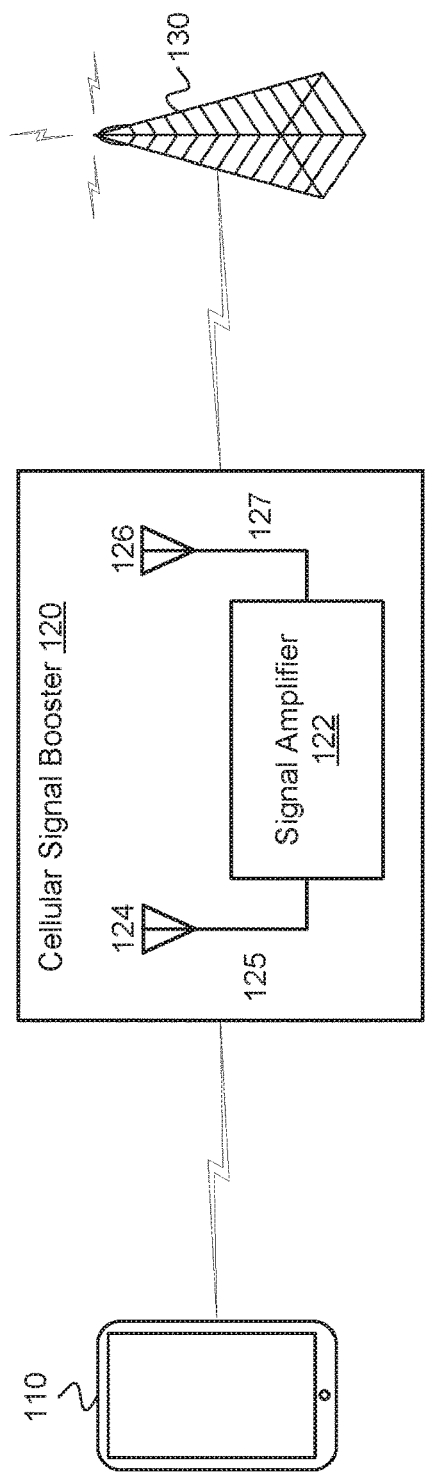
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated node antenna 126 can communicate the uplink signal that has been amplified and filtered to a node, such as base station 130.

In one example, the signal booster 120 can send uplink signals to a node and/or receive downlink signals from the node. While FIG. 1 shows the node as a base station 120, this is not intended to be limiting. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve may be attached to the wireless device 110, but may be removed as needed. In this configuration, the signal booster 120 can automatically power down or cease amplification when the wireless device 110 approaches a particular base station. In other words, the signal booster 120 may determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in 47 CFR Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can be configured to boost selected frequency bands, such as frequency division duplex (FDD) bands 1-32 and time division duplex (TDD) bands 33-44 based on the country or region in which the signal booster is used.

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

Modern base stations are configured to communicate with multiple users using Orthogonal Frequency Division Multiple Access (OFDMA). Multiple access can be achieved in OFDMA by assigning subsets of subcarriers in an Orthogonal Frequency Division Multiplexing (OFDM) symbol to individual users by allocating frequency and time resources. In uplink (UL) communications, signals from multiple users in their assigned frequency and time resources are combined in a single OFDM uplink symbol. In order to efficiently detect and process a received UL OFDM symbol at a base station, the amount of power transmitted by each user device is limited to a maximum power. Limiting gain and noise power in an UL transmission to a base station is referred to as a network protection. By limiting the amount of gain and noise power that can be transmitted by a repeater, the amplifiers in the base station are not saturated or overloaded, and the base station noise floor is not significantly increased. The allowable gain and noise power is typically based on the distance or signal loss from the repeater's donor antenna to the base station and the distance from the handset to the repeater's server antenna. In some embodiments, base stations can communicate, to a wireless device, the amount of power that is received in the UL signal from the wireless device to allow the wireless device to actively adjust the UL power to less than the maximum power allowed at the base station.

As previously discussed, signal boosters are typically configured to amplify and/or filter cellular signals, including downlink (DL) and uplink (UL) signals, with limited communications with the base station or the wireless device. For example, a signal booster typically does not include a modem to modulate or demodulate the signals that are amplified. Accordingly, the signal booster typically does not receive any information from the base station regarding the UL power received at the base station from an amplified UL signal communicated from the signal booster.

In order to limit and control the amount of power transmitted in an uplink signal from a signal booster, the signal loss between the signal booster and the base station can be estimated. The signal loss can be referred to as the base station coupling loss (BSCL). This term is also sometimes referred to as the booster station coupling loss. The base station coupling loss is the coupling loss between the signal booster's donor port and the base station's input port.

Theoretically, the UL signal loss and the DL signal loss between base station and signal booster is roughly equivalent. It should be noted that the signal loss is frequency dependent. Accordingly, the UL signal loss can be estimated by receiving a pilot signal, a signal broadcast from in a DL from a base station at a known frequency and power. This measurement can be referred to as the received signal strength indicator (RSSI). The amount of loss of the received pilot signal, relative to the known transmitted power, can be used to estimate how much loss there will be in a transmitted UL signal. Thus, the measured RSSI can be used to estimate the BSCL. The UL signal gain at the signal booster can then be adjusted based on the estimated BSCL, to maximize the amount of power transmitted while meeting the limitations of the maximum uplink signal power received at the base station.

Differences between the way in which booster stations operate and the operation of wireless devices, such as mobile stations or user equipment, can cause inaccuracies in the BSCL measurement at a cellular booster station. These inaccuracies can cause significant differences between the predetermined maximum uplink signal power level at the base station, and the actual received uplink signal power level from the signal booster UL signal. The differences typically reduce the UL signal power level transmitted by the signal booster and limit the range of wireless devices using the signal booster to communicate.

One difference between the operation of signal boosters and wireless devices is the bandwidth in which they operate. Wireless devices, such as user equipment (UEs) or mobile stations (MSs) that are designed to communicate using cellular bands, typically communicate using a signal that is narrow band relative to the signal boosters. For example, the downlink band of 3GPP LTE band 2 is 60 MHz. However, a UE will use only a small portion of that bandwidth. The UE bandwidth may be 1.4, 3, 5, 10, 15, or 20 MHz.

In contrast, a signal booster is typically designed to operate over the entire bandwidth of a selected band, such as band 2, which has a downlink bandwidth of 60 MHz. The signal booster can simultaneously receive multiple DL signals in a single band. A radio frequency detector operating at the signal booster will detect the combined power of all of the DL signals in the selected band. This will cause the received signal strength indicator (RSSI), as measured at the signal booster, to be greater than the actual RSSI for a single user of the signal booster. The increased RSSI (decreased BSCL) of the DL signal power in the selected band at the signal booster will result in a reduced gain and/or noise power applied to the UL signal of a user that is transmitted by the signal booster, thereby limiting the range of the user.

Figure 2:
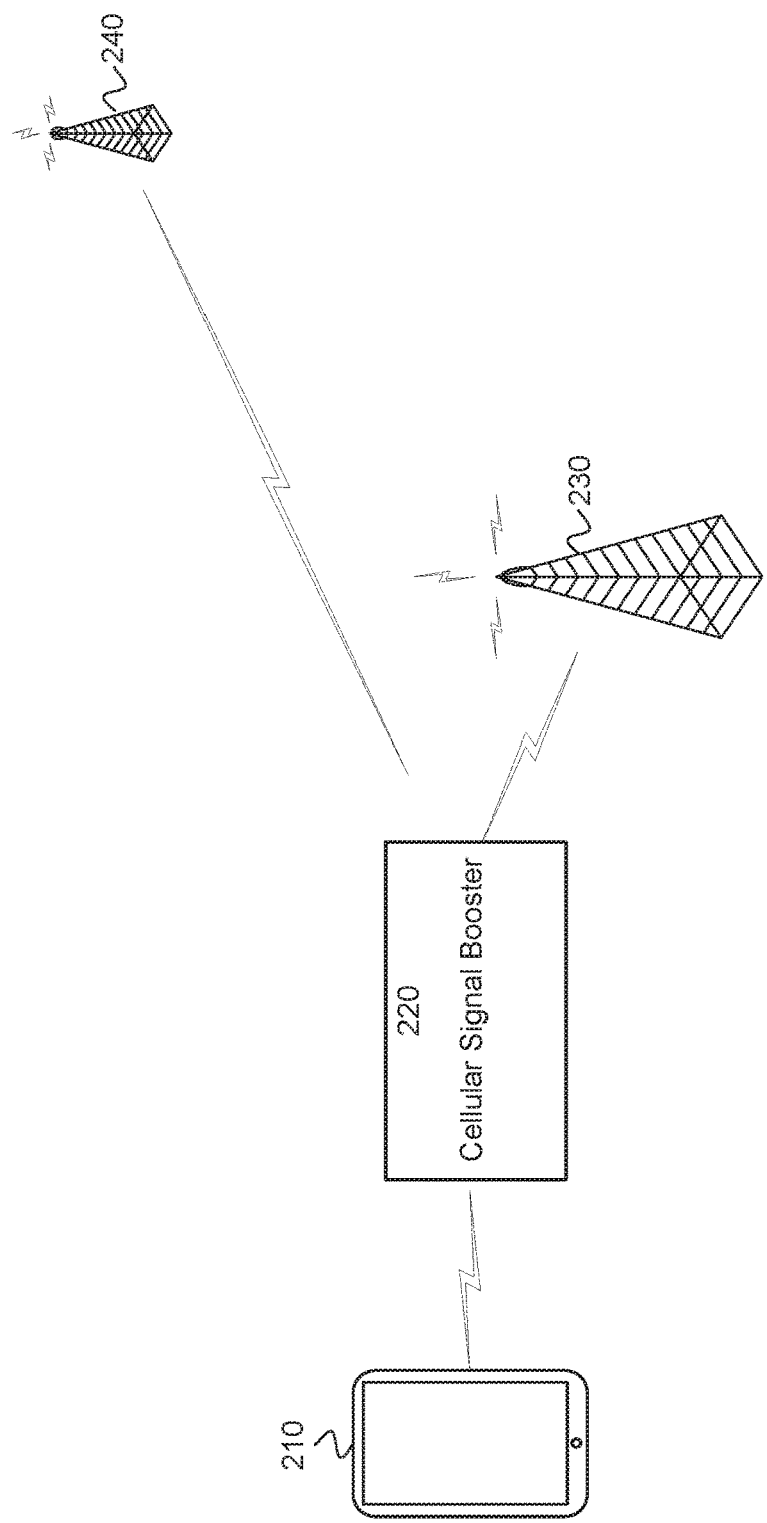
FIG. 2 illustrates a signal booster in communicate with a relatively close base station and a relatively distant base station in accordance with an example.

In addition, the location of multiple base stations relative to the signal booster can also cause inaccuracies in the BSCL measurement. For example, FIG. 2 shows a wireless device 210 in communication with a signal booster 220. The signal booster can receive signals from multiple base stations, such as the relatively close base station 230 and the relatively distant base station 240.

Signal boosters 220 are typically employed to enable one or more wireless device 210 users to communicate with a relatively distant base station 240. The distant base station can be used by the user's cellular signal provider. However, another base station 230, operated by a different cellular signal provider, which is operating in the same frequency band, may be located relatively close to the signal booster 220. Downlink signals from the relatively close base station 230 will have a much higher RSSI (lower BSCL) at the signal booster 220 than the DL signals from the relatively far base station 240. The RSSI or BSCL measurements of the combined DL signals from the relatively close 230 and relatively far base stations 240 will result in significantly reduced UL gain and/or noise power settings for the UL signals transmitted from the signal booster 220 for a user of the relatively far base station 240. If the RSSI of the DL signals from the close base station 230 are sufficiently high, it can result in the gain and/or noise power of the transmitted UL signal being set sufficiently low that the UL signal cannot be accurately received at the relatively far base station 240.

Signal boosters, such as signal booster 220, also typically provide amplification of UL signals over a fairly broad spectrum relative to a UE or MS. For example, a signal booster may provide amplification of an UL signal over an entire 3GPP LTE band. The broadband amplification of the band, and not just a single signal, results in an amplification of all of the noise in the band as well. The amplification of the noise effectively raises the noise floor for a receiver, such as a base station. In order to ameliorate the effects of increasing the noise floor, the Federal Communication Commission (FCC) in the United States has issued an order, in FCC Report and Order 13-21, that sets threshold levels for uplink gain and noise levels.

In FCC Report and Order 31-21, the transmitted noise power in dBm/MHz of consumer boosters at their uplink and downlink ports shall not exceed −103 dBm/MHz−RSSI. Where RSSI (received signal strength indication) is the downlink composite received signal power in dBm at the booster donor port for all base stations in the band of operation. RSSI is expressed in negative dB units relative to 1 mW. (2) The transmitted maximum noise power in dBm/MHz of consumer boosters at their uplink and downlink ports shall not exceed the following limits: (i) Fixed booster maximum noise power shall not exceed −102.5 dBm/MHz+ 20 Log 10 (Frequency), where Frequency is the uplink mid-band frequency of the supported spectrum bands in MHz. (ii) Mobile booster maximum noise power shall not exceed −59 dBm/MHz.

Similarly, FCC Report and Order 31-21 limits the uplink gain in dB of a consumer booster referenced to its input and output ports such that it shall not exceed −34 dB−RSSI+ MSCL, where RSSI is the downlink composite received signal power in dBm at the booster donor port for all base stations in the band of operation. RSSI is expressed in negative dB units relative to 1 mW. MSCL (Mobile Station Coupling Loss) is the minimum coupling loss in dB between the wireless device and input port of the consumer booster. MSCL is to be calculated or measured for each band of operation and provided in compliance test reports.

In accordance with one embodiment, a signal booster can be configured to channelize a DL signal received at the signal booster in a selected band. Channelize, as used herein, can include filtering a selected band to pass portions of the band, or block portions of the band, to reduce the RSSI (or increase the BSCL) of one or more DL signals that cause an undesirable reduction in UL gain and/or noise power of an uplink signal for a user of the signal booster. An undesirable reduction in the UL gain and/or noise power is a reduction in the UL gain and/or noise power of the UL signal transmitted by the signal booster for the user, wherein the reduction in UL gain and/or noise power is used to protect the network (i.e. base stations) when no additional protection is actually necessary. For example, a DL signal received from a close BS may result in a relatively high RSSI. However, the booster may be boosting an UL signal for transmission to a distant BS relative to the close BS. Removing, or substantially attenuating the signal from the close BS can result in an undesirable reduction in the UL gain, while not actually protecting the distant BS since a higher power UL gain can be used to transmit to the distant BS while staying within the parameters of the FCC.

While the FCC requirements are used as an example, they are not intended to be limiting. Other governmental or industry standards may also designate limits or suggestions for UL signal gain limitations for a signal booster. By more accurately measuring DL signals, the UL signal gain can be maximized relative to the governmental or industry limits or suggestions.

Channelizing the DL and UL signals in selected bands at the signal booster can reduce interference from other DL signals from a same base station or different base stations and allow more accurate measurements of BSCL for a selected user, thereby enabling the UL signals transmitted from the signal booster for the selected user to have an increased gain and increase the range over which the selected user can communicate. In addition, channelizing the UL signal can allow filtering that will reduce the noise power transmitted to base stations and allow the signal booster to meet the specification requirements. Filtering of the UL signal can typically occur at an equivalent location (i.e. channel) as is filtered in the DL signal. For example, in an FDD band, such as 3GPP LTE band 5, if the bottom 15 MHz of the DL spectrum for 3GPP LTE band 5 is filtered to attenuate signals in those frequencies, the bottom 15 MHz of the UL spectrum for 3GPP LTE band 5 can also be similarly filtered. By filtering the UL signal, the noise floor can be effectively reduced, thereby enabling a base station, such as a 3GPP LTE eNodeB, to receive the UL signal with a lower noise floor.

Figure 3A:
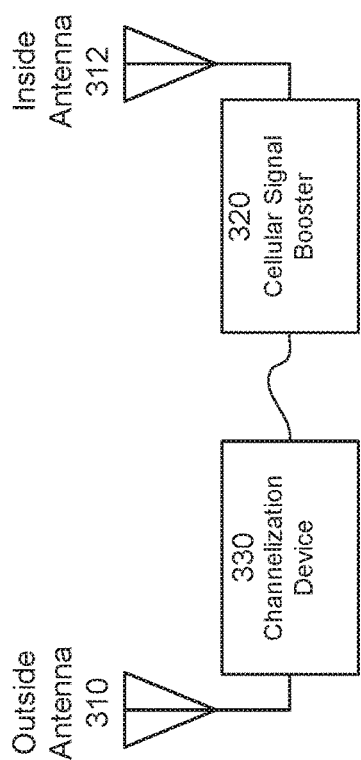
FIG. 3a illustrates an example of a channelization device in accordance with an example.

FIG. 3 illustrates several example embodiments that can be used to channelize a downlink signal of a signal booster. In FIG. 3a, a channelization device 330 can be configured to receive a cellular downlink signal from an outside antenna 310, filter the downlink signal to provide a channelized downlink signal, and output the channelized downlink signal to a signal booster 320. The channelization device 330 can be passive or active. A passive channelization device can passively filter the downlink signal for communication to a signal booster 320.

The signal booster 320 can receive an uplink signal via the inside antenna 312. If the RSSI value of the downlink signal is greater than a threshold value, which would require a reduction in gain and/or noise power of the uplink signal, then the signal booster can use the channelized downlink signal, or information regarding the channelized downlink signal, to reduce the RSSI value of the downlink signal and increase a gain and/or noise power of an uplink signal. The uplink signal can then be communicated to the base station using the outside antenna 310. An active channelization device 330 can be configured to amplify uplink and/or downlink signals to compensate for any signal loss caused by the channelization device 330. Additional details of the channelization device are discussed in more detail in the proceeding paragraphs.

Figure 3B:
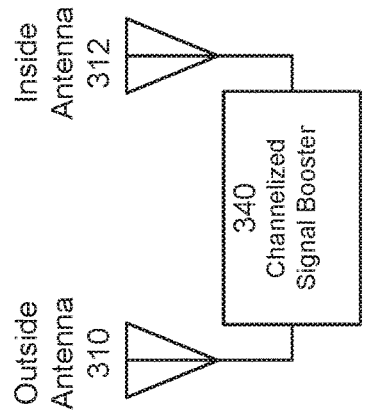
FIG. 3b illustrates a channelized signal booster in accordance with an example.
Figure 3C:
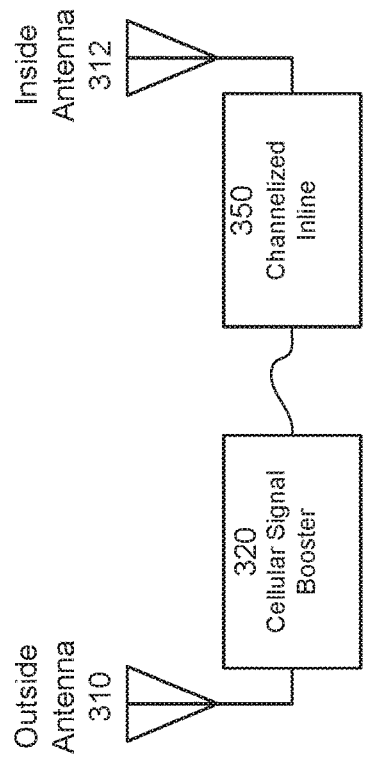
FIG. 3c illustrates an active channelized inline device in accordance with an example.

An example of a channelized signal booster 340 is illustrated in FIG. 3b. The channelized signal booster 340 can comprise the functions of the channelization device 330 integrated into the signal booster 320 to provide a signal booster that is configured to channelize a downlink signal to enable one or more channels to be filtered, or have a component of a BSCL value of the one or more channels removed from the overall BSCL value, as previously discussed. Additional active solutions can include the channelization and filtering of intermediate frequency (IF) signals associated with a received downlink signal, and the use of digital signal processing (DSP) to digitally filter the downlink signal. In addition, the outside antenna 310 can be actively tuned to reduce the contribution of undesired signals to the BSCL value of the downlink signal. These concepts will be described more fully in the proceeding paragraphs. FIG. 3c illustrates an example of a signal booster 320 with an active channelized inline box 350.

In another embodiment, the BSCL at the signal booster can be estimated in other ways than using RSSI. For example, signal attenuation through the Earth's atmosphere can be calculated based on the distance the signal travels. Accordingly, a distance from a signal booster to one or more base stations can be estimated. A BSCL value can then be calculated based on the estimated distance. The gain and/or noise power of an uplink signal of the signal booster can then be adjusted, if necessary. For example, if the BSCL value is less than a threshold value, the gain and/or noise power can be adjusted.

The downlink signal received at the signal booster can be in one or more frequency bands. For example, the downlink signal can be located in 3GPP LTE FDD bands 1-32 or TDD bands 33-44 based on the country or region in which the signal booster is used. In the United States, the downlink signal can be located in 3GPP LTE bands 2, 4, 5, 12, 13, 17 or 25.

In one embodiment, the distance can be calculated from the signal booster to the one or more base stations using a geographic coordinate system location of the signal booster and the one or more base stations. In another embodiment, the distance from the signal booster to the one or more base stations can also be estimated using a pilot signal timing. In another embodiment, the distance from the signal booster to the one or more base stations can be estimated based on the pilot signal timing and a difference in the geographic coordinate system location of the signal booster and the one or more base stations. In one example, the geographic coordinate system location of the signal booster and/or base stations can be estimated using a global positioning satellite (GPS) system.

After estimating the distance between the signal booster and the one or more base stations, a signal loss over that distance can be calculated. The amount of signal loss that occurs in Earth's atmosphere is dependent on the frequency of the signal. In addition, the type of terrain at which the signal booster and one or more base stations are located can significantly affect the amount of signal loss. Different signal loss terrain models may be used depending on the terrain type. The type of terrain can determine how much the signal is absorbed and/or reflected by different types of geographic and/or manmade features. Models can be designed or used to account for different amounts of absorption and reflection that may occur between the signal booster and the one or more base stations. For example, the signal loss terrain model may be modeled for one or more of a country terrain, a flat terrain, a hilly terrain, a suburb terrain, a city terrain, a mountain terrain, a forest terrain, and a line of site terrain, and so forth.

In another embodiment, the BSCL contribution of one or more channels in a selected band of a downlink signal can be removed based on a location of a base station relative to the signal booster. As previously discussed, signal boosters are typically configured to communicate with a relatively distant base station. Different base stations often communicate in different frequency channels within a selected frequency band. Channelization filtering can be used to identify different downlink signals based on the channel (i.e. frequency) at which the downlink signals are communicated. It can be assumed that downlink signals associated with selected frequency channels in a band are communicated from a base station with a known geographic coordinate. Alternatively, based on the RSSI or BSCL of a selected channel, the location of the base station can be estimated. For instance, downlink channels with a relatively high RSSI power level can be assumed to be associated with a relatively close base station. Conversely, downlink channels with a relatively low RSSI power level can be assumed to be associated with a relatively distant base station.

In one example, a signal booster can be employed by a business or homeowner that only uses wireless service provider A. The location of the base station for wireless service provider A can be relatively distant to the signal booster. Downlink signals from the relatively distant base station can be communicated in channel A of a selected band. In addition, downlink signals transmitted by cellular service provider B can be received at the signal booster on channel B of the selected band from a relatively close base station. It can be determined that none of the users of the business or homeowner use the signal booster to communicate on channel B to wireless service provider B. Accordingly, the BSCL of the downlink signals transmitted on channel B from the relatively close base station can be discounted. The contribution of the downlink channel B signals can be removed from a broadband RSSI measurement of the selected channel. Alternatively, a narrowband measurement can be performed that does not include the downlink signals on channel B in the selected band. This can significantly reduce the RSSI measurements (or increase the BSCL measurement) and enable uplink signals communicated on channel A to have an increased gain and/or noise power level for communication to the relatively distant base station when the BSCL value for the channel A is less than a threshold value.

In another embodiment, a downlink signal can be measured at a plurality of channels for a selected band to determine a base station coupling loss (BSCL) for the plurality of channels. In one embodiment, signals in the plurality of channels can be measured using a comb filter to add delayed versions of each signal to accommodate for reflections and refractions of the signals as they travel between the base station and the signal booster. The RSSI measurement of the combined signals in the comb filter can enable a more accurate BSCL value to be determined for each of the plurality of channels.

A base station can then be associated with each of the plurality of channels, based on the frequency of each channel (i.e. a base station may transmit at a known frequency), or the BSCL of each channel (i.e. a lower BSCL infers a closer base station to the signal booster, and vice versa) and an estimated distance of each base station. A BSCL value for each channel of the plurality of channels associated with a base station can be disregarded when a user is not communicating with the base station. The BSCL value may be determined by only accounting for downlink signals transmitted from base stations that are used by one or more users of the signal booster.

Alternatively, a broadband measurement for a selected band can be made to estimate BSCL, and the contributions of the BSCL made by channels received from base stations for which users of the cellular signal booster do not use can be subtracted from the total BSCL value. The gain and/or noise power of an uplink signal can then be adjusted if the BSCL value is less than a threshold value. In one embodiment, the gain and/or noise power of the uplink signal of the signal booster can be adjusted based on a lowest BSCL value of a station to which one or more users are communicating.

Figure 4:
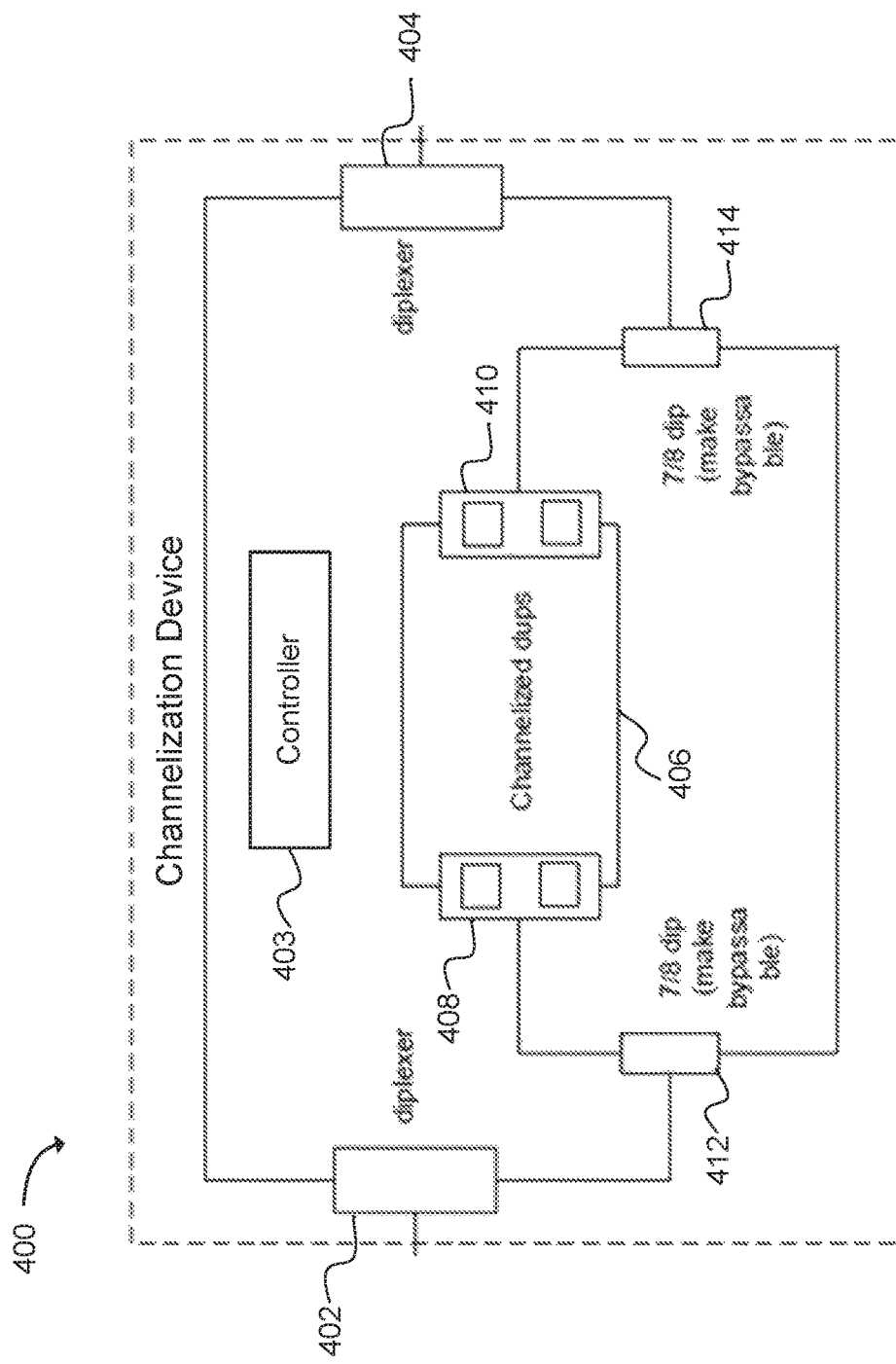
FIG. 4 illustrates a channelized box in accordance with an example.

FIG. 4 provides one example of a channelization device 400 for increasing signal booster gain at a signal booster. The channelization device 400 comprises a first diplexer 402 configured to be coupled to a first interface port and a second diplexer 404 configured to be coupled to a second interface port. In one embodiment, the first interface port can be an outside antenna, such as outside antenna 310, and the second interface port can be an inside antenna, such as inside antenna 312. The channelization device 400 can include radio frequency connections to enable the channelization device 400 to be connected to the first and/or second interface ports, or other components such as a signal booster, as illustrated in FIG. 3a and FIG. 3c.

The channelization device 400 can further comprise a controller 403 that is configured to receive a gain reduction level of an uplink signal from the signal booster (i.e. 320) that is caused by a base station coupling loss value of the downlink signal. The controller 406 can be configured to measure a channelized base station coupling loss (BSCL) value for one or more channels in a channelized downlink signal and communicate the channelized BSCL value to the signal booster 320 to allow the signal booster to increase the gain and/or noise power based on the channelized BSCL value. Alternatively, the controller can be integrated in the signal booster, such as the channelized signal booster 340 shown in FIG. 3.

The channelization device 400 can further comprise a channelized filter 408. In the example illustrated in FIG. 4, the channelized filter 406 is comprised of a first channelized duplexer 408 and a second channelized duplexer 410. Switches 412, 414 can be used to create a bypass path around the channelized filter 408 to allow an uplink signal or a downlink signal to bypass the channelized filter 406.

Figure 5:
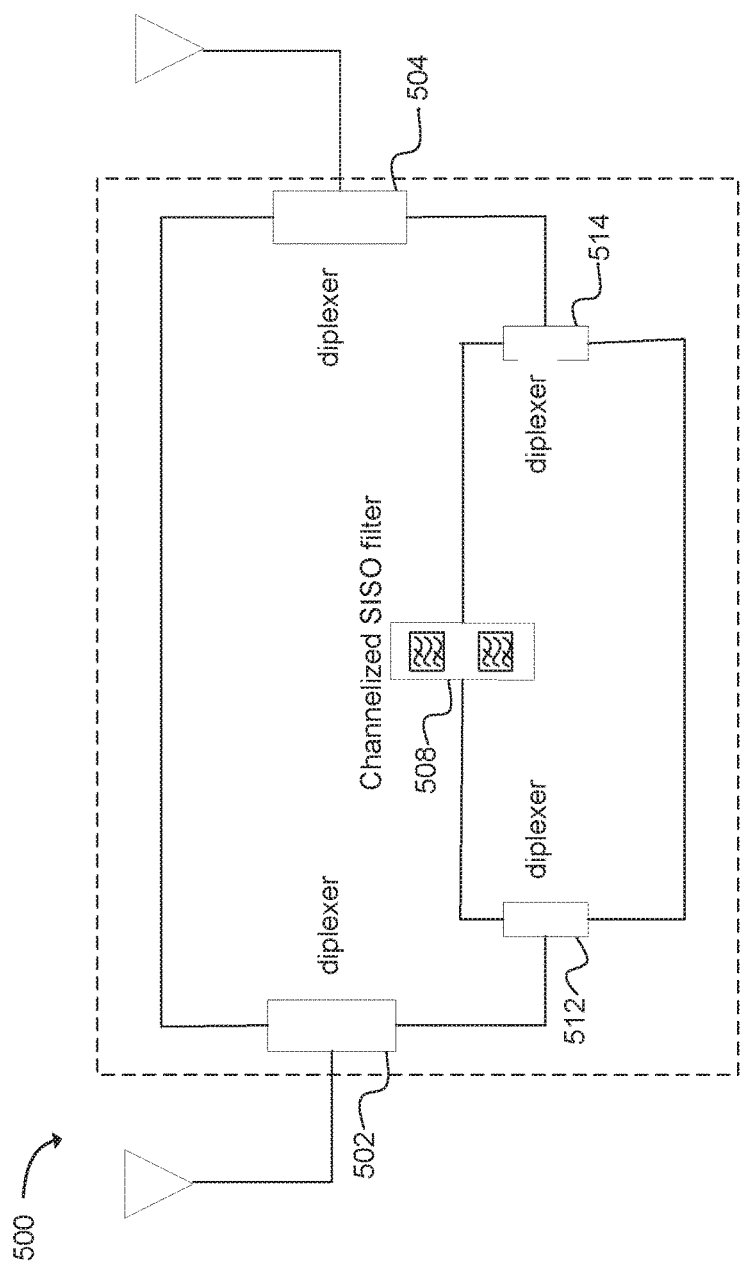
FIG. 5 illustrates a channelized single input single output (SISO) filter in accordance with an example.

FIG. 5 provides another example of a channelization device 500 for increasing signal booster gain at a signal booster. The channelization device 500 comprises a first diplexer 502 that is configured to be coupled to a first interface port and a second diplexer 504 that is configured to be coupled to a second interface port. As in the example of FIG. 4, the channelization device 500 can be configured with radio frequency connectors to enable the channelization device 500 to be connected to the first and second interface ports, or other components such as a signal booster, as illustrated in FIG. 3a and FIG. 3c.

The channelization device 500 further comprises a third diplexer 512 coupled to the first diplexer 502, and a fourth diplexer 514 coupled to the second diplexer 504. A pass-through path is coupled between the third diplexer and the fourth diplexer to allow signals to pass between the first interface port and the second interface port when the BSCL value of the downlink signal is greater than a selected threshold value. A channelized filter 508 is located between the third and fourth diplexers 512, 514. In one embodiment, the channelized filter can be a single input single output (SISO) filter. The SISO filter 508 can include two or more filters, such as bandpass filters, in a single package. In this example, a first bandpass filter can be configured to pass one or more channels in a selected band of a downlink signal. A second bandpass filter can be configured to pass one or more channels in the selected band of an uplink signal.

For example, the SISO filter 508, using bandpass filters, can be configured to pass channel A and block channel B, where channel B represents downlink signals from a relatively close base station. By filtering the downlink signals in channel B, the BSCL for the selected band can be increased (the RSSI can be decreased). When the BSCL is less than a selected threshold, the filtering can be used to increase the gain and/or noise power of an uplink signal for a signal booster.

In another embodiment, a user can select to pass channel A and block (i.e. filter) channel B, or block channel A and pass channel B using the SISO filter 508. The determination of which channel to pass can depend on which channel a user of the cellular booster signal is using, and which channel may be causing inaccurate measurements of the BSCL.

In another embodiment, a selected band can be selectively filtered using a plurality of bandpass filters. For example, four filters, each with a bandpass of approximately 15 MHz, can be used to selectively filter a selected band with a bandwidth of approximately 60 MHz. One or more of the bandpass filters can be configured to pass channels operating within the 15 MHz band of the bandpass filter. The selection of the bands that are passed may be selected based upon setup of a channelization device 500. Alternatively, the selection may be actively determined and selected based on which channel(s) a user is communicating on, and which channel(s) are causing interference.

In one embodiment, a channelized bandpass filter can be configured to communicate one or more channels in a selected band to a signal booster. The signal booster can be configured to measure a BSCL value of the one or more channels in the selected band of a downlink signal. The signal booster can then set an uplink gain or a noise power of an uplink signal based on the BSCL value of the one or more channels passed by the channelized bandpass filter.

In another embodiment, the SISO filter 508 can be configured as a notch filter. A notch filter can be configured to filter an undesired downlink signal, such as a downlink signal from a relatively close base station, as previously discussed. The use of a notch filter can be advantageous for use in a band that includes many channels. The notch filter can be designed with a SISO filter that comprises two or more bandpass filters configured to filter a selected frequency band, or notch.

In another embodiment, the channelization device 500 can include one or more amplifiers operatively coupled to the channelized filter 508 and configured to set a noise power and/or provide sufficient amplification to the downlink signal to compensate for loss in the channelization device 500. In one embodiment, the amplifiers can be further configured to provide amplification to the downlink signal to compensate for downlink signal loss that occurs between the channelization device and a signal booster, as shown in FIGS. 3a and 3c.

In another embodiment, an active channelization device can be configured to increase signal booster gain while maintaining network protections. The active channelization device can be configured as illustrated in any of FIGS. 3a-3c. The active channelization device can provide a channelization device 330, such as illustrated in FIG. 3a, with approximately 0 dB net gain (or enough gain to set a noise figure). In one embodiment, the active channelization device can be an accessory to a standard, signal booster 120, as illustrated in FIG. 1.

Channelization, using an active channelization device, can be performed only on bands of interest. The bands of interest can include bands that are frequently used, or where a gain or noise power of an UL signal is frequently reduced due to BSCL levels that are skewed by other downlink signals, as previously discussed. In one embodiment, the channelization bands and parameters can be user-selectable.

Attaching the channelization device 330, as shown in FIG. 3a, to an outside antenna 310 side of a signal booster 320 can enable the signal booster to react to a narrower RSSI bandwidth, thereby decreasing a network RSSI sensitivity. An active channelization device can be used to set a noise figure and to obtain more UL output power than a passive channelization device.

In one embodiment, channelization device 330 can be an active channelization device 330. The active channelization device 330 can be configured to communicate with a signal booster 320 to set UL gains and other desired parameters. In one embodiment, an active channelized device can include a controller that is configured to receive a gain reduction level of an uplink signal from the signal booster that is caused by a base station coupling loss value of the downlink signal. The controller can then measure a channelized base station coupling loss (BSCL) value for one or more channels in a channelized downlink signal and communicate the channelized BSCL value to the signal booster to allow the signal booster to increase the gain and/or noise power based on the channelized BSCL value. Alternatively, the active channelization device 330 can amplify the uplink signal based on the channelized BSCL value and the received gain reduction level.

In another embodiment, the active channelized device can be an active channelized inline device 350, as illustrated in FIG. 3c. The active channelized inline device 350 can be located on an inside antenna 312 side of a signal booster 320. The signal booster 320 can reduce gain due to a BSCL measurement that is lower than a selected threshold, as required. The active channelized inline device 350 can be configured to provide sufficient amplification to make up for network protection gain reductions by the signal booster 320.

In one example, the signal booster 320 can communicate, to the active channelized inline device 350, a BSCL level, or other desired measurement such as RSSI, and the amount of gain reduction to the UL signal due to the BSCL level. The active channelized inline device 350 can then provide channelization and amplification to restore the reduced gain, as previously discussed. Additional amplification can also be provided to make up for path loss between the signal booster 320 and the active channelized inline device 350.

In one embodiment, the channelized filter, such as the SISO filter 508 illustrated in FIG. 5, or another type of channelized filter, can be comprised of intermediate frequency (IF) filters, such as notch filters. The downlink signal can be down converted using a local oscillator (LO) to an intermediate frequency (IF). The IF notch filter can be configured to allow most channels to pass. Notching out a strongest interfering downlink signal can substantially solve most problems of UL amplification loss due to BSCL interference issues.

However, a single IF notch filter may not always achieve desired specification requirements, or have sufficient bandwidth to shift a notch around a selected band. For example, band 2 has a downlink bandwidth of 65 MHz. In one embodiment, a varying IF notch filter design can be used, as illustrated in FIG. 6.

Figure 6:
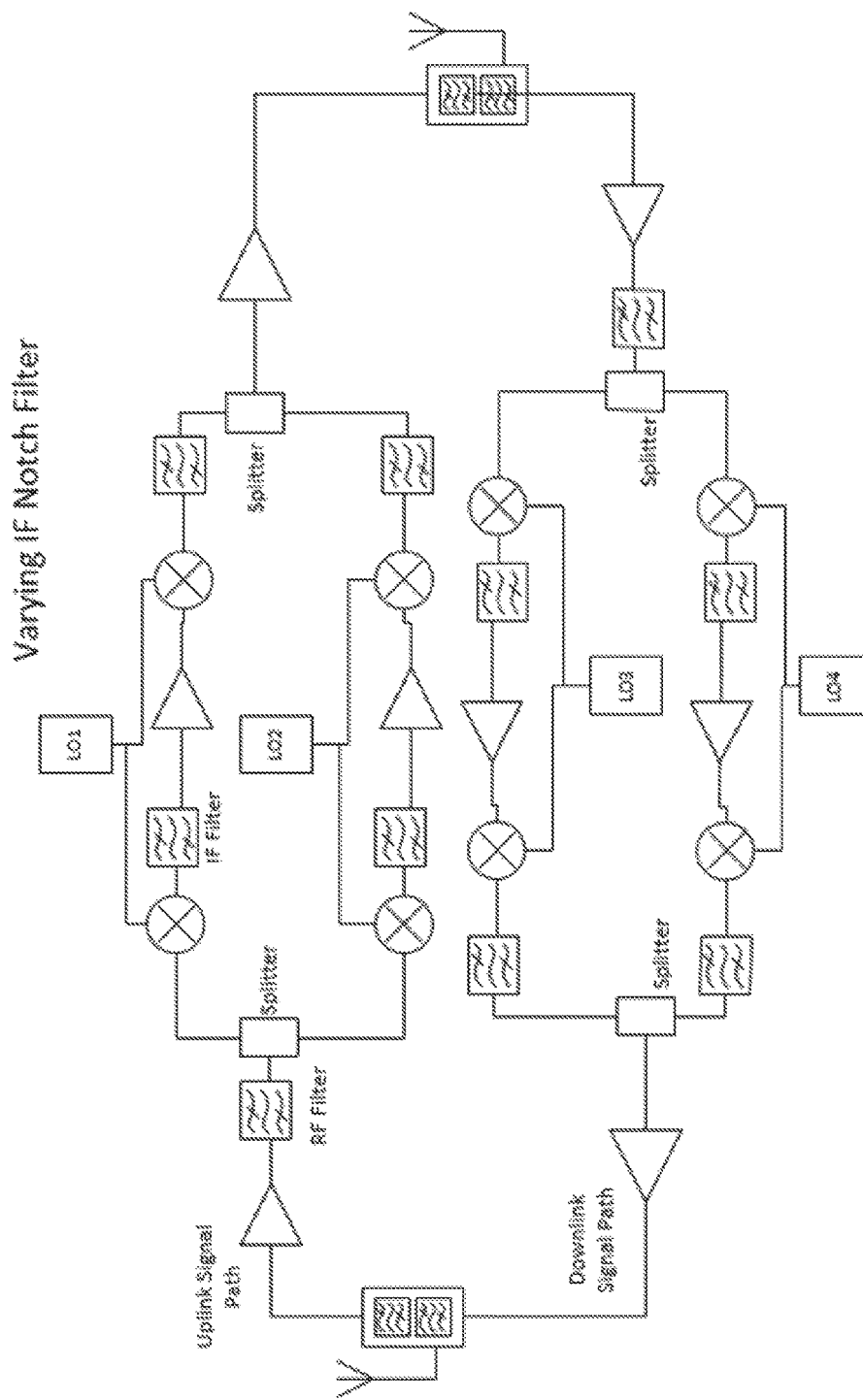
FIG. 6 illustrates a varying intermediate frequency (IF) notch filter for a channelized signal booster in accordance with an example.

In the example of FIG. 6, the IF filters can be designed to have almost as much bandwidth as the RF band does. This enables the booster or user to adjust the width and spectral location of the notch filter. The varying notch filter can be designed to optimize the notch location and minimize the bandwidth of the notch (thereby allowing more channels to pass). In a wideband mode, the signal booster can detect whether it has reduced gain due to DL network protection requirements, as previously discussed. The signal booster can scan the RF band and find the frequency of a selected downlink signal with an amplitude greater than a selected threshold value. The signal booster can set an IF notch over the selected downlink signal and slowly increase the notch width until the booster is no longer in a reduced gain mode. The IF filters can be the same center frequency, or different center frequencies. The frequencies of the local oscillator 1 (LO1) and LO2 can be adjusted to provide a desired notch width. The local oscillators, LO1 and LO2 can be the same as LO3 and LO4 if the downlink IF filter center frequency is shifted.

Figure 7:
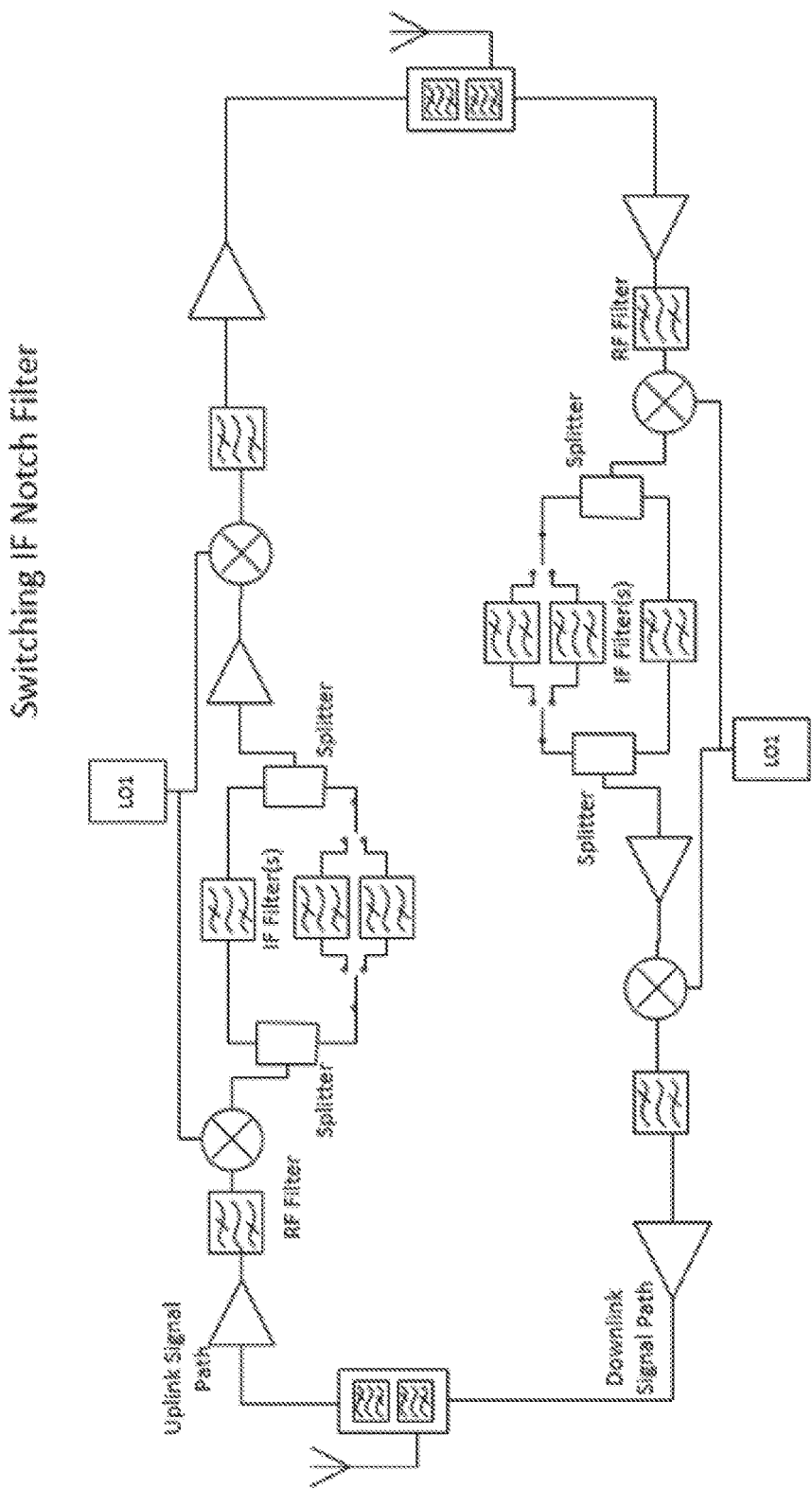
FIG. 7 illustrates a switching IF notch filter for a channelized signal booster in accordance with an example.

FIG. 7 provides an example of a switching IF notch filter. As in the example of FIG. 6, the IF filters can have almost as much bandwidth as the RF band does. The switched IF center frequencies can be offset to create a notch between a main IF filter. This enables the IF signal booster or a user to adjust a width of the IF notch filter, by switching between IF filters, as well as a spectral location of the notch.

To optimize a notch location and minimize its bandwidth, the signal booster can detect, in a wideband mode, whether the signal booster has reduced a gain and/or a noise power of an UL signal due to network protection requirements. The cellular signal amplifier can scan the RF band and find the frequency of a selected channel, such as a channel with an amplitude greater than a selected threshold. The cellular signal amplifier can then set an IF notch filter over the selected channel, with the IF notch filter having a minimum notch width to avoid any gain reduction for network protection.

In one embodiment, LO1 in FIG. 7 can be the same frequency as LO2 if the downlink IF filter center frequency is shifted. The same concept can work without the splitters, but then the notch width cannot be varied. A greater number or fewer number of IF filters can be added to the switched section to allow for more notch widths. The IF filters can be configured in a SISO configuration to remove the splitter if there are no switched IF filters.

The examples of FIG. 6 and FIG. 7 have been described with respect to the embodiment of FIG. 3b, in which the channelization filters and amplifiers are integrated into the cellular signal amplifier. However, the varying IF notch filter and the switching IF notch filter can also be designed to operate in the active channelization device 330 or the active channelized inline device 350. In each of these embodiments, the active channelization device 330 or the active channelized inline device 350 can be configured to communicate with the signal booster 320.

In another embodiment, RF channelized filters can be integrated in the signal booster 320. A switch can be used to provide for various channel options. A default option may be wideband (i.e. no channelization). The signal booster can automatically or manually change channels or stay in a wideband mode. In an automated mode, the signal booster can: detect a wideband BSCL value or an RSSI value for a downlink signal; switch in a channelized filter; detect the channelized DL BSCL or RSSI value; repeat for all channelization options; and select the channelization filter option that maximizes performance. The use of RF channelized filter can be superior to that of a passive channelization device since the downlink noise figure and uplink output power can be preserved.

Figure 8:
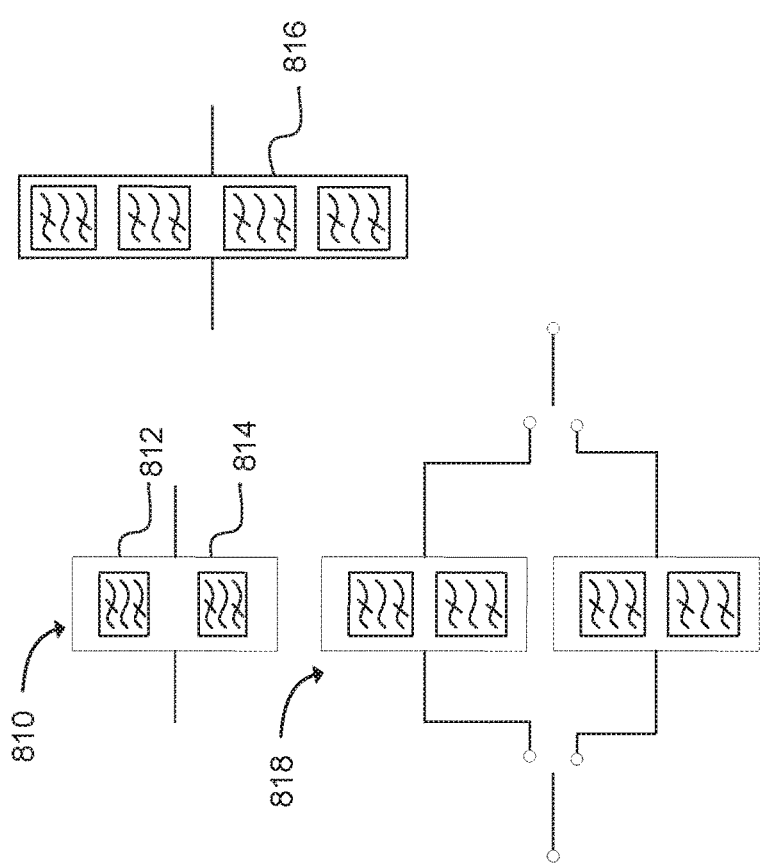
FIG. 8 illustrates a SISO multiband radio frequency (RF) or IF notch filter in accordance with an example.

FIG. 8 provides an example of a SISO multi-band RF or IF notch filter. In this example, an RF notch filter can be implemented by creating a SISO module 810 with two narrowband bandpass filters 812, 814. For example, for an uplink Band 2 notch, one bandpass filter can be configured at 1850-1865 MHz, and the other bandpass filter can be configured at 1880-1910 MHz. This would effectively notch out 1870-1875 MHz. This concept can be used in a passive channelization device by also adding a DL SISO notch bandpass filter, thereby creating four filters in the same SISO package, as shown at 816. The notch filter can be moved around by switching between multiple SISO modules, as shown in 818.

Figure 9A:
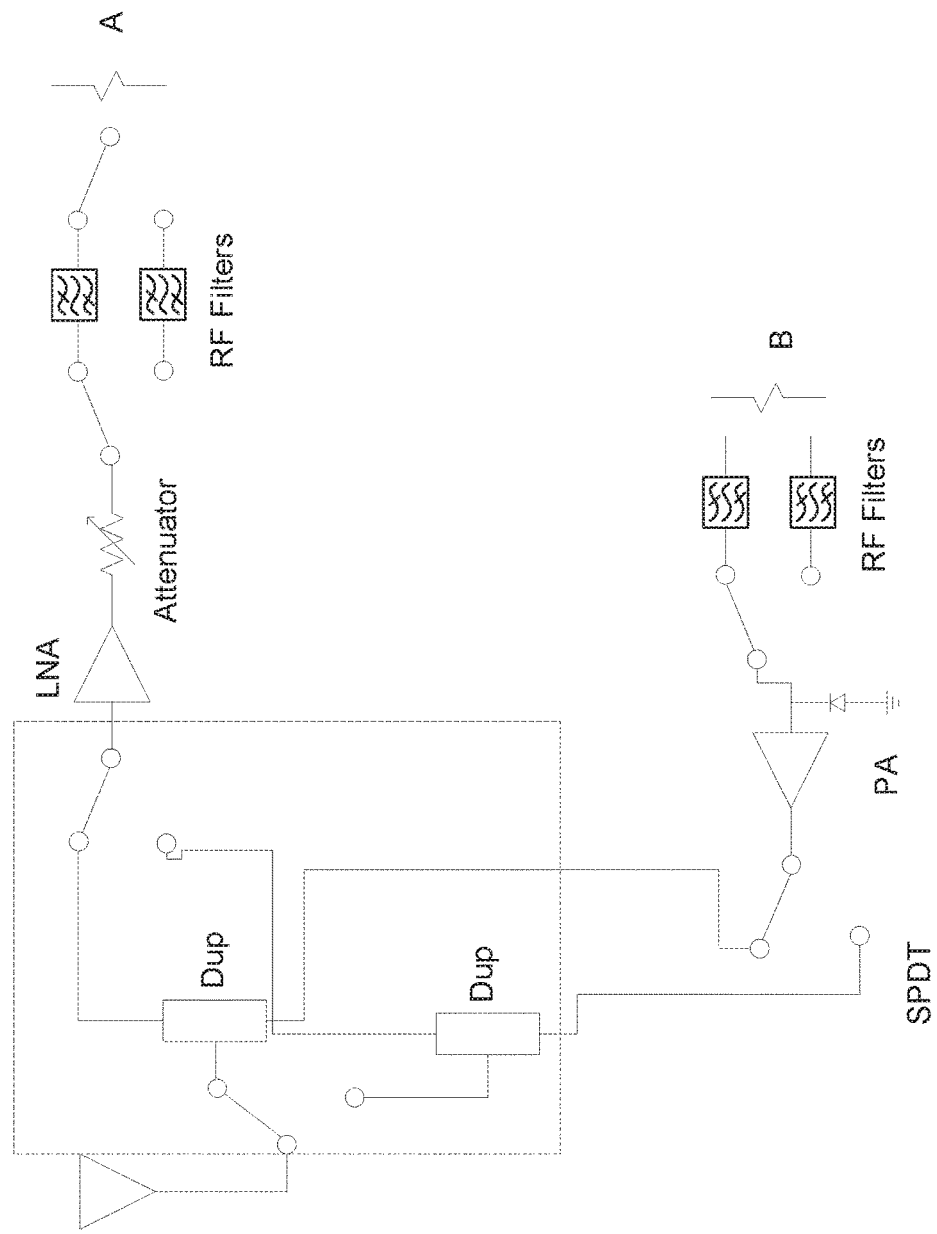
Figure 9B:
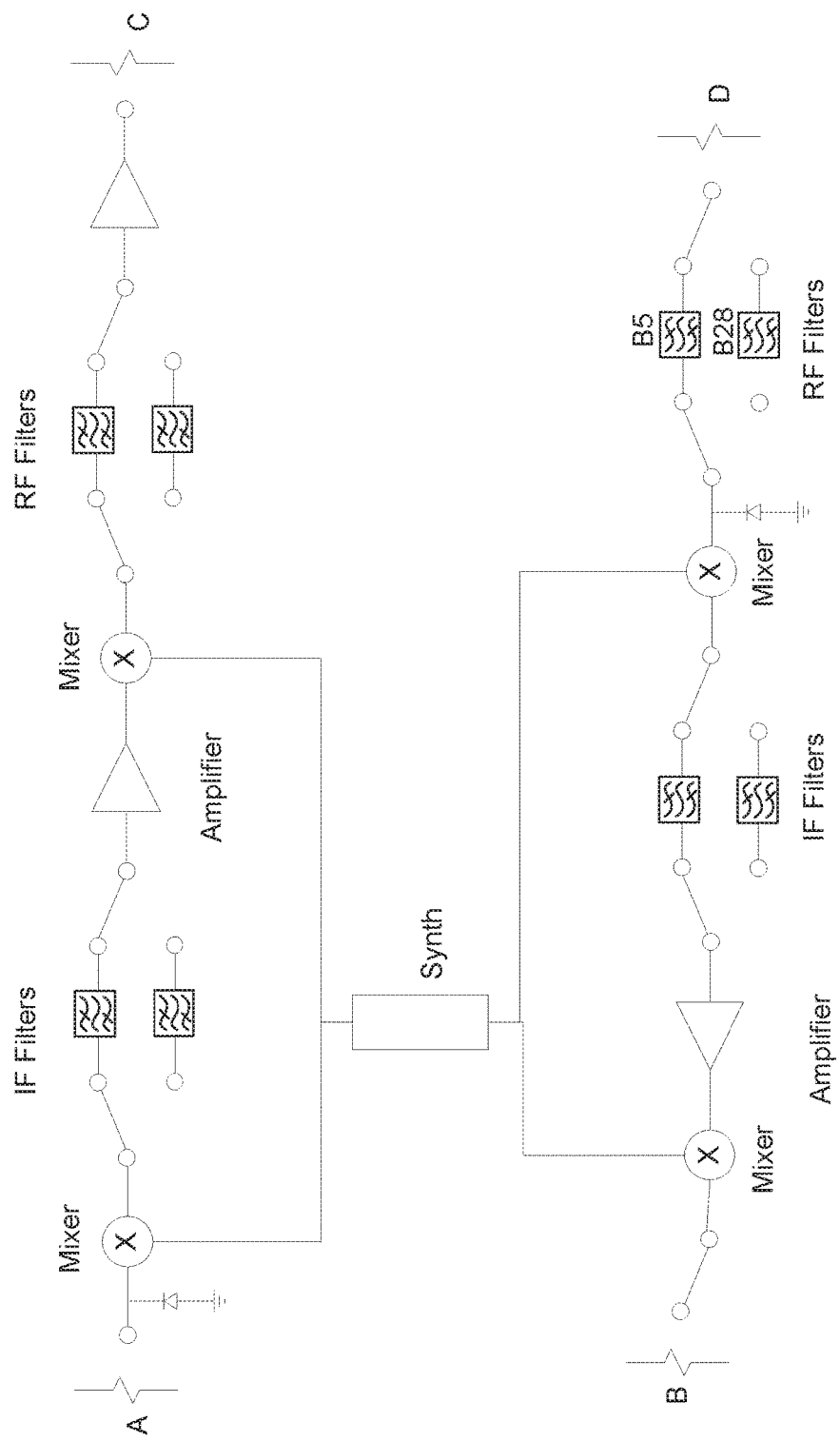

FIGS. 9a-9c illustrate an example of an active solution. It should be noted that FIGS. 9a-9c illustrate a single circuit diagram, which has been broken into three sections for purposes of illustration. The sections of the circuit that have been divided are illustrated showing section A and section B in FIG. 9a, which adjoin with section A and section B, respectively, in FIG. 9b. Similarly, section C and section D in FIG. 9b adjoin with section C and section D, respectively, in FIG. 9c.

In the example of FIG. 9a-9c, a dual-band, non-simultaneous channelized device 900 is disclosed. In one example embodiment, the dual-band device can enable channelization of two different bands. The use of a non-simultaneous channelized device can reduce costs by switching in only one band at a time. For example, band 5 and band 28 may both be channelized. The channelized device 900 can switch between channelization of band 5 or band 28. The switching may be performed manually, or may be automated.

For example, in one embodiment, automated switching between two channelized bands may be performed by detecting a wideband downlink received signal strength indicator (RSSI). A channelized filter for a selected band, such as band 5, may then be switched in, and a channelized downlink RSSI can be measured for the selected band. A channelized filter for an additional band, such as band 28, may then be switched in, and a channelized downlink RSSI for the additional band can be measured. The channelized filter that maximizes performance (i.e. wideband (no channelization), channelized B5, or channelized B28) can then be selected. While this example is for bands 5 and 28, it is not intended to be limiting. Any of bands 1-44 may be channelized, as previously discussed. In addition, more than 2 bands may be incorporated in a channelized device.

In the example of FIG. 9a-9c, the dual band, non-simultaneous channelized device 900 can be integrated into the channelized signal booster 320, the active channelization device 330, or the active inline channelized device 350 of FIG. 3. The dual-band, non-simultaneous channelized device can be configured to allow switching between bands to identify a strongest downlink interfering signal and then provide filtering to reduce an amplitude of the interfering signal. In this example, both UL and DL can be analyzed.

In one example, 20 MHz IF filters can be used for 3GPP LTE Band 5 (B5). Two IF filters can be used to provide a notch filter for 835 MHz to 845 MHz. However, two synthesizers are used to perform this action. The embodiment of FIG. 9 assumes only one IF filter is needed in series. The switching between bands can be accomplished using common microcontroller pins to speed up switching.

Figure 10A:
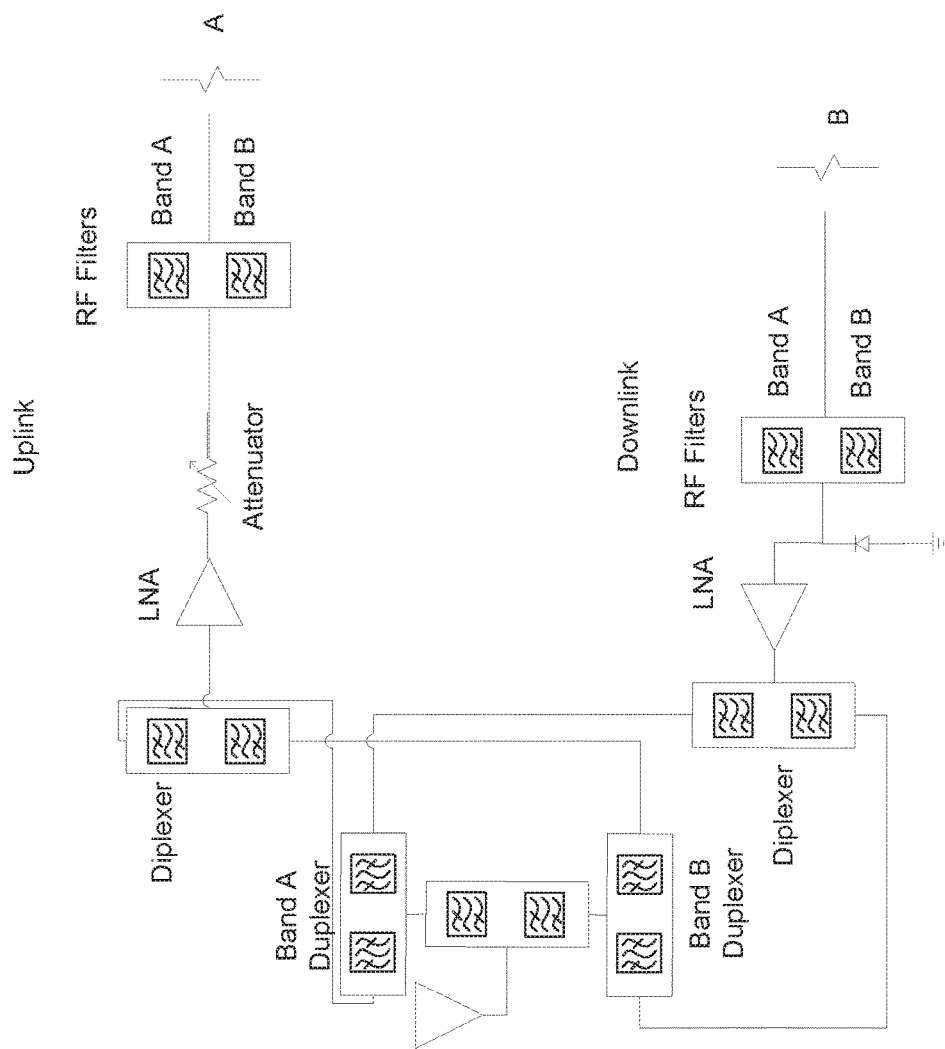
FIGS. 10a-10c illustrates a channelized SISO implementation in accordance with an example.
Figure 10B:
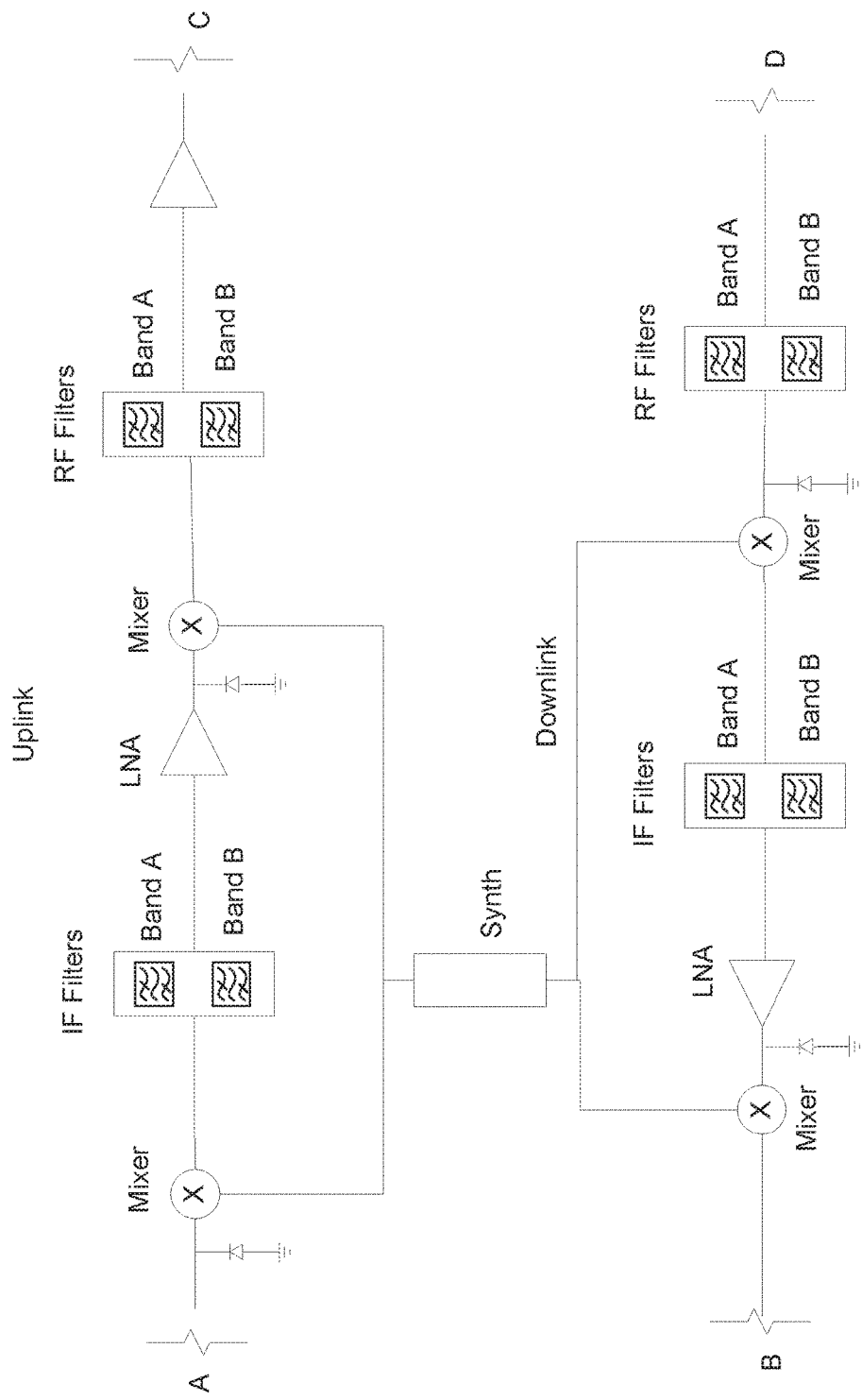
Figure 10C:
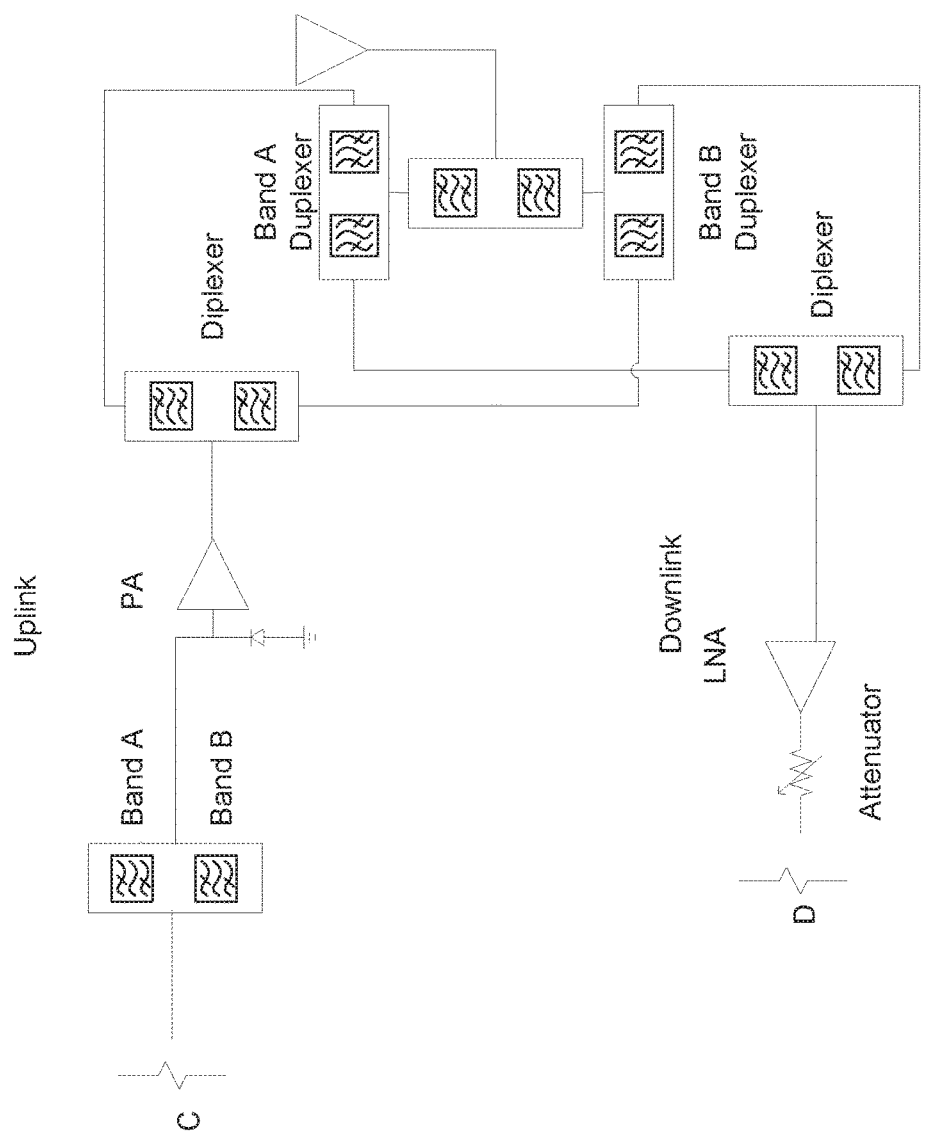

FIGS. 10a-10c illustrates another active solution, comprising a channelized SISO implementation. It should be noted that FIGS. 10a-10c illustrate a single circuit diagram, which has been broken into three sections for purposes of illustration. The sections of the circuit that have been divided are illustrated showing section A and section B in FIG. 10a, which adjoin with section A and section B, respectively, in FIG. 10b. Similarly, section C and section D in FIG. 10b adjoin with section C and section D, respectively, in FIG. 10c.

With the use of a SISO architecture, as illustrated in the example of FIG. 10a-10c, multiple bands can be channelized and operate at the same time. Switching between different bands is not required. SISO band-sharing can be used to significantly reduce the cost of implementation. Synthesizers may be shared since the signals are all in one signal path. SISO IF filters can be used as well. It can be assumed that only one IF filter is needed in series.

In one example, a SISO notch filter for a band, such as 3GPP LTE Band 25, can have the following specifications:

| Parameter | Frequency (MHz) | Units | Spec |
|---|---|---|---|
| Low Band Response | | | |
| Passband#1 Insertion Loss | 1850-1865 | dB | <3 |
| Passband#2 Insertion Loss | 1890-1915 | dB | <3 |
| Passband#1 Return Loss | 1850-1865 | dB | >10 |
| Passband#2 Return Loss | 1890-1915 | dB | >10 |
| Attenuation | 1870-1885 | dB | As much as possible |
| | 1930-1935 | dB | >30 |
| | 1935-1995 | dB | >35 |
| High Band Response | | | |
| Passband#1 Insertion Loss | 1930-1945 | dB | <3 |
| Passband#2 Insertion Loss | 1970-1995 | dB | <3 |
| Passband#1 Return Loss | 1930-1945 | dB | >10 |
| Passband#2 Return Loss | 1970-1995 | dB | >10 |
| Attenuation | 1950-1965 | dB | As much as possible |
| | 1910-1915 | dB | >30 |
| | 1850-1910 | dB | >35 |
| Power into either port | | W | >1 |

The notch filter can be configured to substantially filter a selected signal in B25. Similarly, notch filters in other bands can be used to remove selected channels received in the DL signal to decrease the RSSI in the DL signal, thereby allowing the UL signal gain to be increased at the signal booster.

Figure 11A:
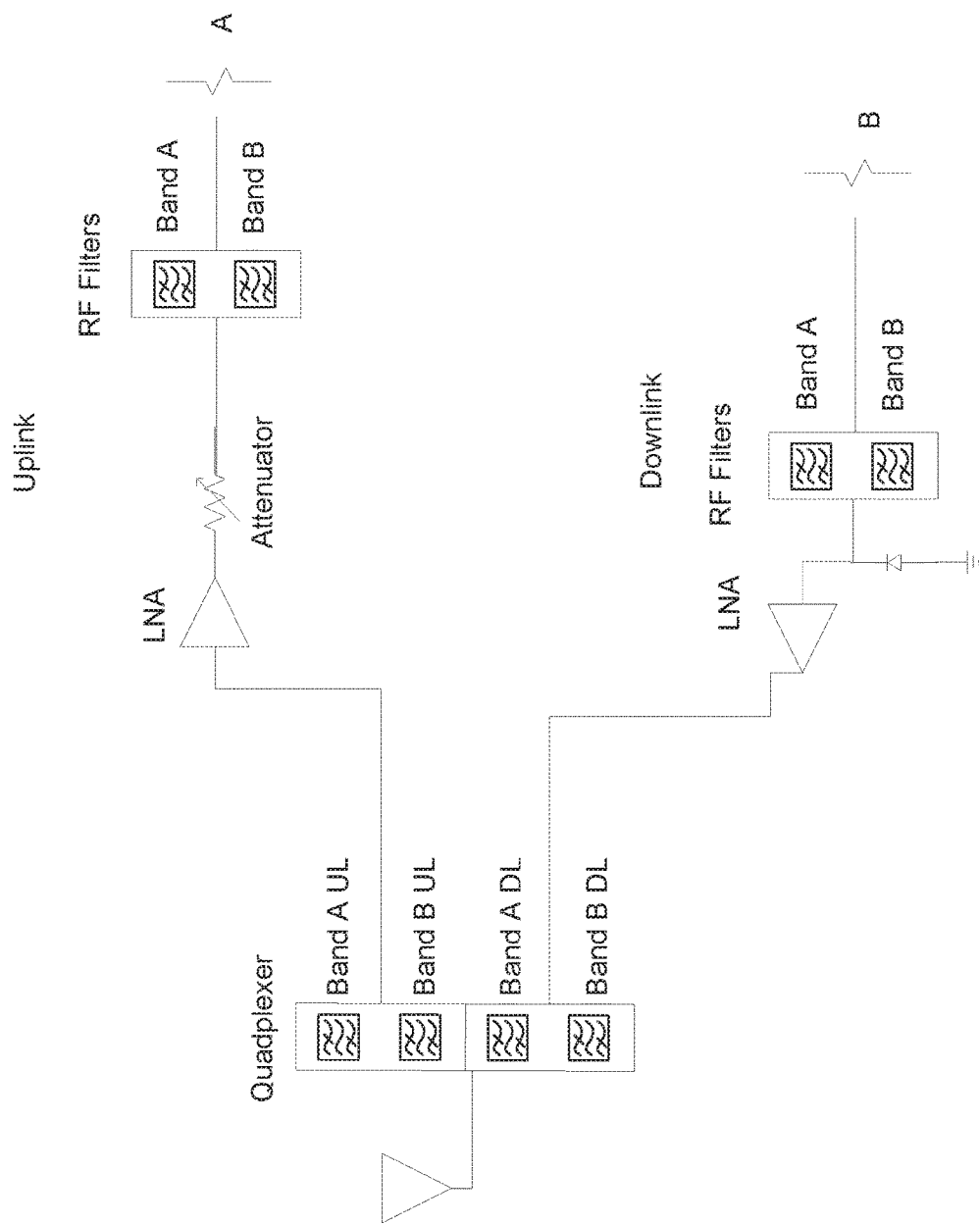
FIGS. 11a-11c illustrates a channelized SISO implementation using a quadplexer in accordance with an example.
Figure 11B:
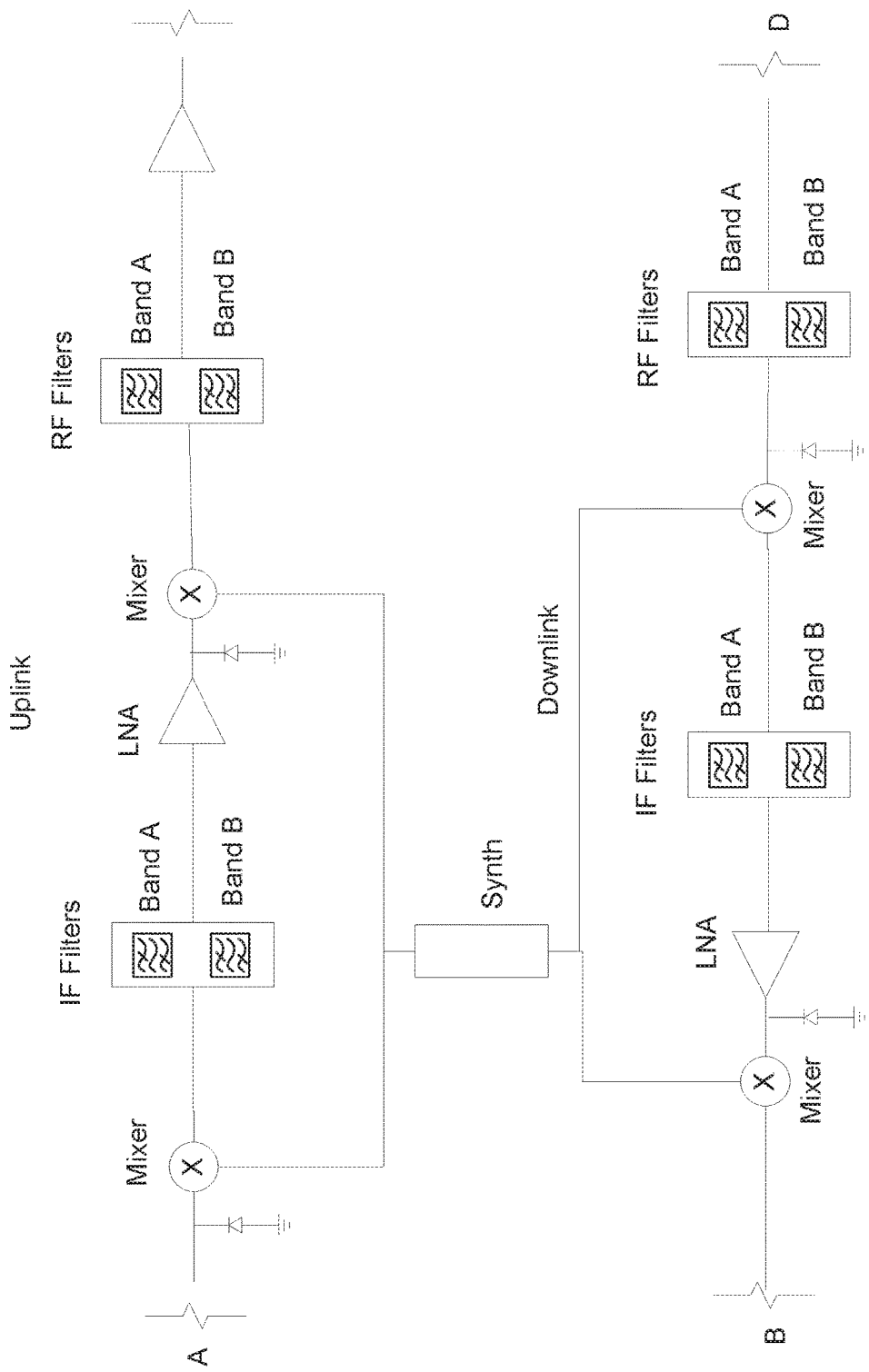
Figure 11C:
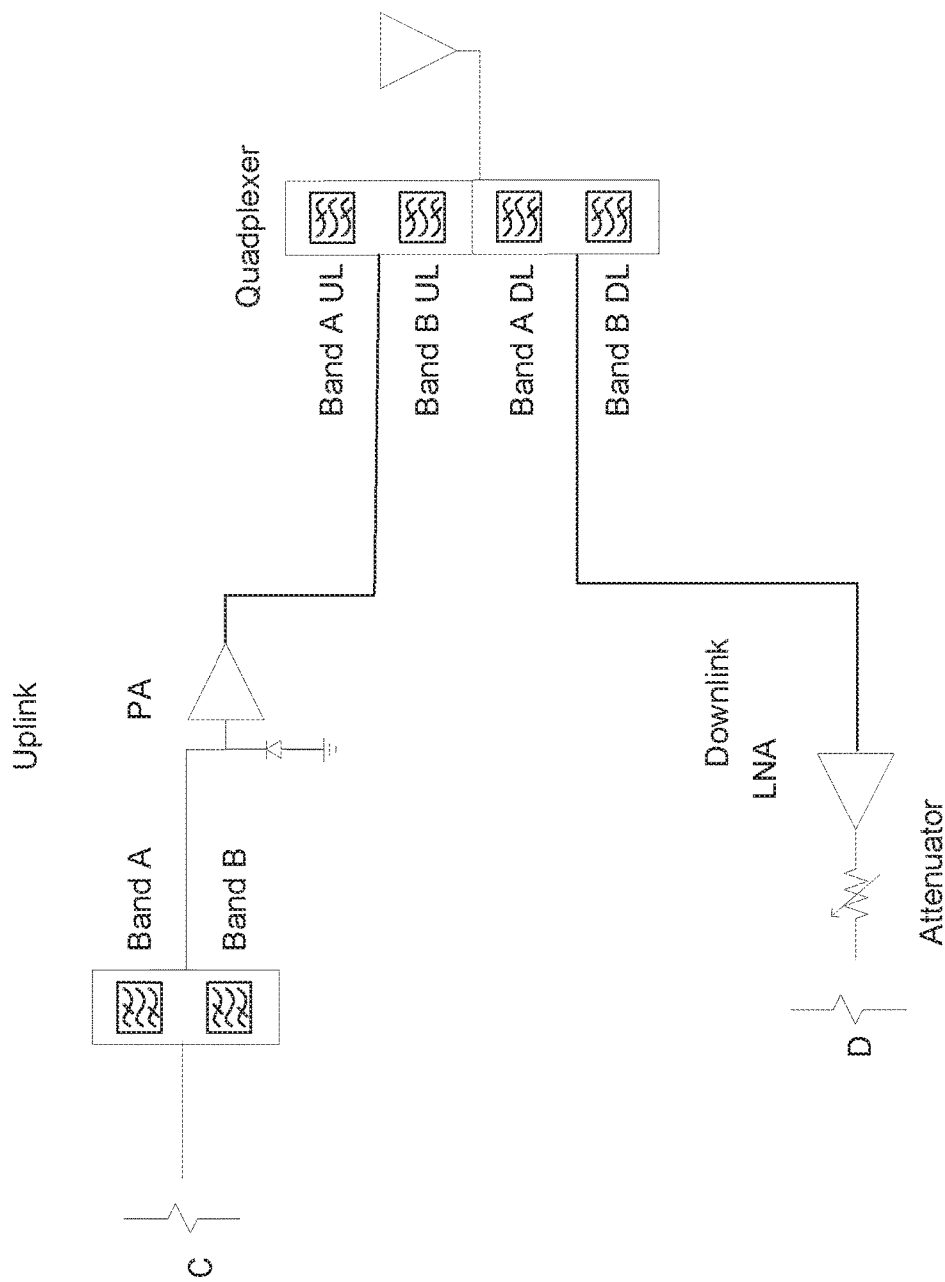

As illustrated in FIGS. 11a-11c, a quadplexer may be used to avoid diplexer losses on the front end. The use of the quadplexer can also increase output power by 3 dB and decrease the noise figure by 3 dB. In one embodiment, diplexers can be used at the bandpass ports to isolate the filters.

In another embodiment, an active channelization device can be implemented using a digital signal processor (DSP) to digitize and channelize the broadband downlink signal and filter selected channels within the downlink signal to optimize gain for each channel based on network protection. In one embodiment, each channel in the band can have a different gain level due to the DSP filter.

Figure 12A:
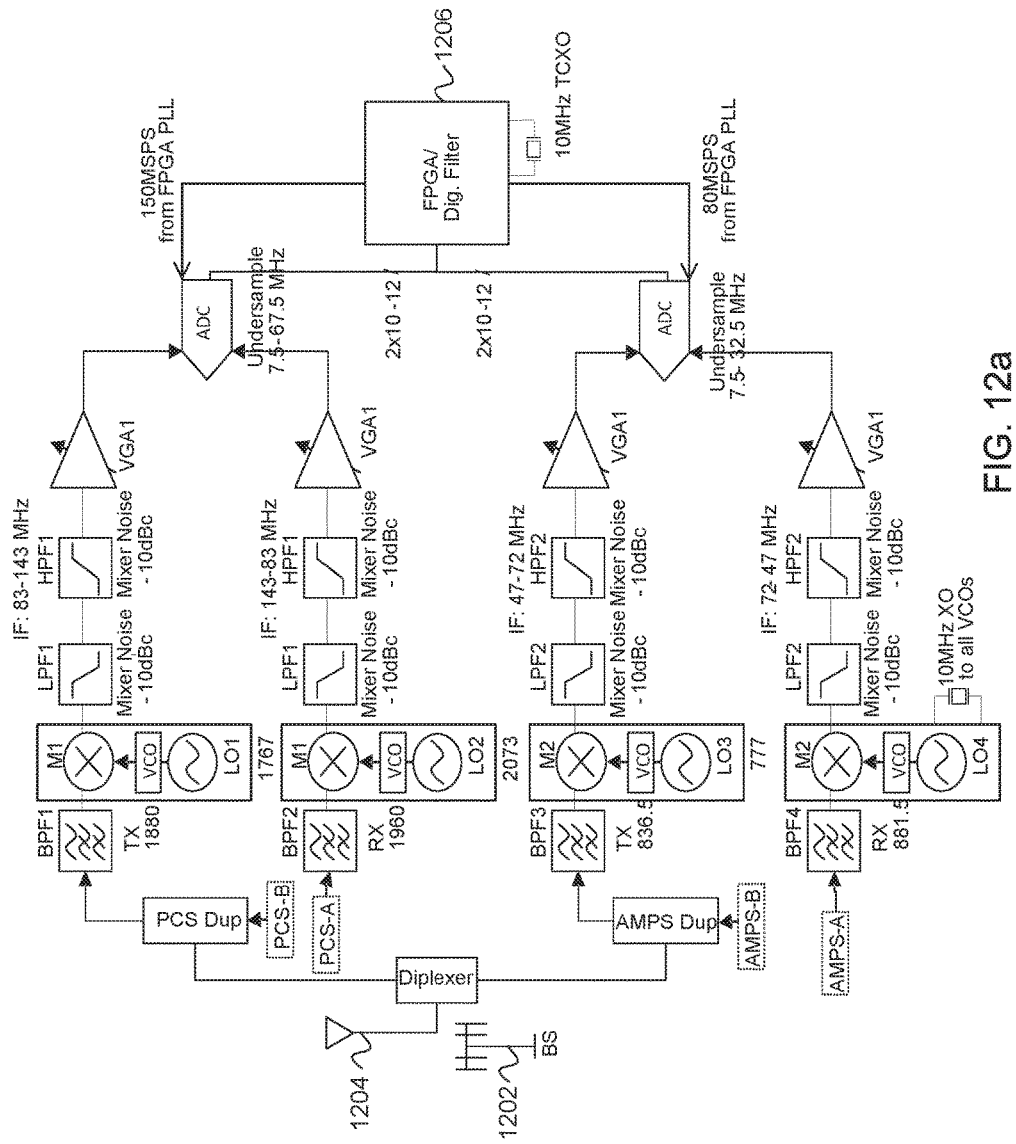
FIGS. 12a and 12b illustrate a channelized digital implementation using a digital signal processor (DSP) in accordance with an example.
Figure 12B:
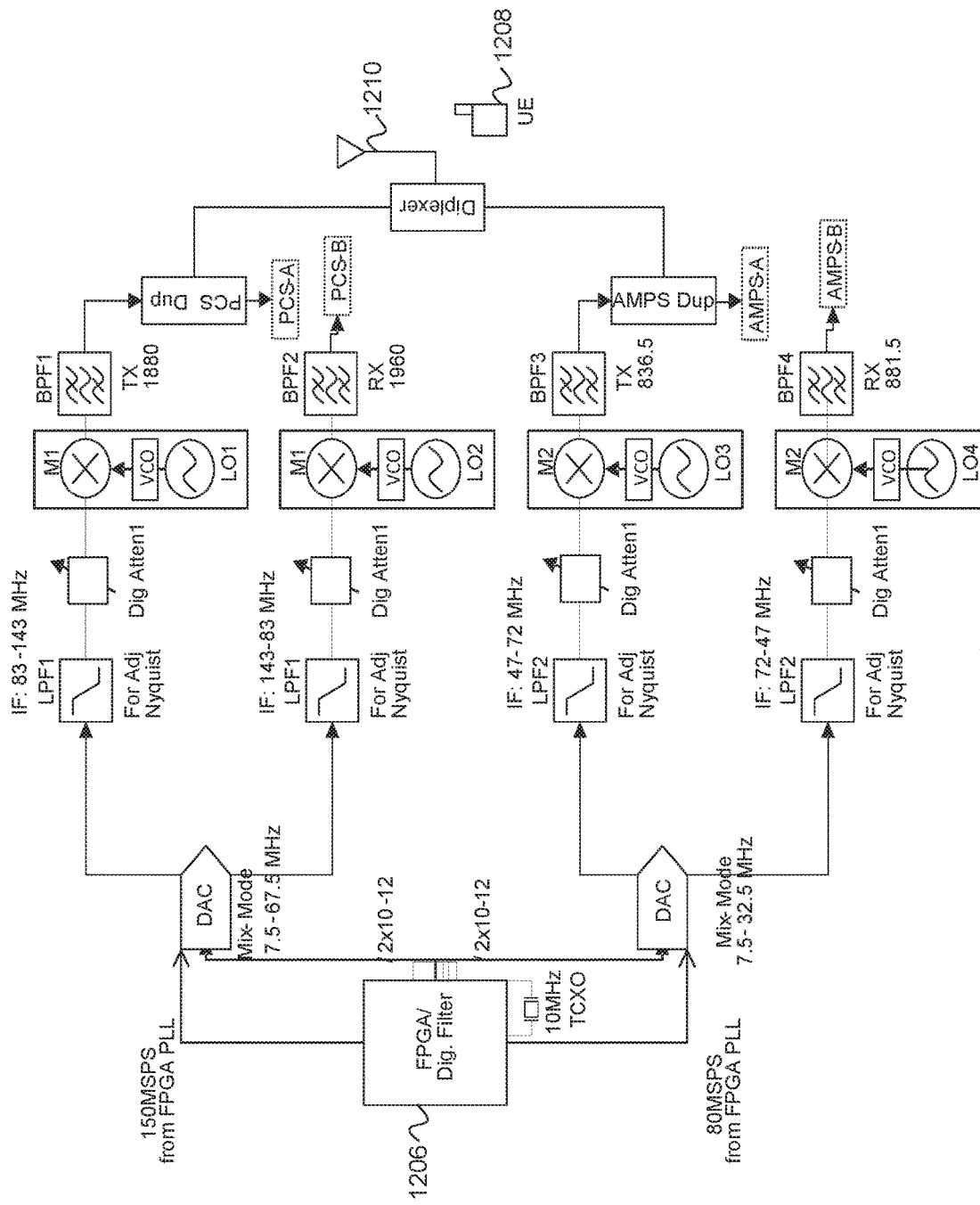

FIGS. 12a and 12b provide examples of channelization using a digital signal processor (DSP), such as a field programmable gate array, or another type of DSP. FIG. 12a illustrates a downlink path for a signal booster in which one or more signals transmitted from one or more base stations 1202 can be received at an antenna port 1204 of the signal booster as a broadband signal. The broadband signal can be down converted, filtered, amplified, and digitized using an analog to digital converter. The digitized signal can then be channelized using the DSP 1206. One or more channels in the digital signal can then be removed using the DSP 1206 to reduce an RSSI of the downlink and enable the gain of the UL signal to be increased by the signal booster.

Similarly, FIG. 12b illustrates a signal path for the signal booster in which the downlink filtered digital signal can be converted to an analog signal using a digital to analog converter, upconverted, and sent to an antenna port 1210 for transmission to one or more UEs 1208. The signal booster can then provide greater gain to the UL signal from the UE(s) 1208 based on the decreased RSSI.

In another example, antenna tuning can be used to reduce RSSI of selected channels in a band in order to maximize the gain of the UL signal. In one embodiment, an antenna with a rotating motor can auto-direct the antenna direction to avoid reducing gain by reducing the RSSI contribution of selected interfering channels. In another embodiment, an antenna can be selected from a plurality of antennas. The antenna that results in the highest UL gain, due to a lowest RSSI value of a broadband signal can be selected. In another embodiment, active beam steering can be used with an array of antennas to minimize the effects of one or more interfering DL channels within a band. In another example, an antenna can be tuned to a null of an undesired DL channel within the band. The antenna may use switched capacitor and inductor banks. The tuned antenna could be automated, which may require communication with the signal booster. Alternatively, the antenna could have its own detectors and microcontroller that can be used to determine what needs to be channelized and how to do it.

Figure 13:
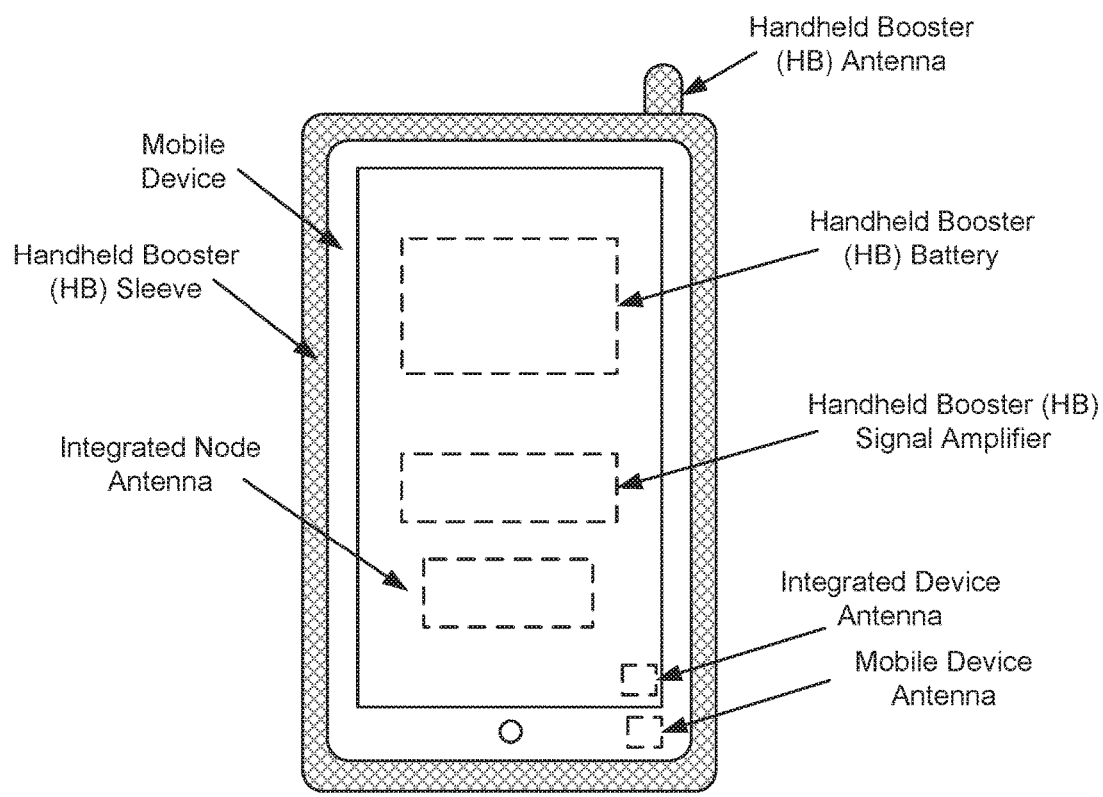
FIG. 13 illustrates a handheld booster in communication with a wireless device in accordance with an example.

While various embodiments described herein, and illustrated in FIGS. 1-13, have been described with respect to a cellular signal amplifier with an outside antenna and an inside antenna, this is not intended to be limiting. Channelization of downlink signals in order to increase BSCL values to reduce network sensitivity can also be accomplished using a handheld booster, as illustrated in FIG. 13. The handheld booster can include an integrated device antenna and the integrated node antenna that are typically used in place of the indoor antenna and outdoor antenna, respectively.

Figure 14:
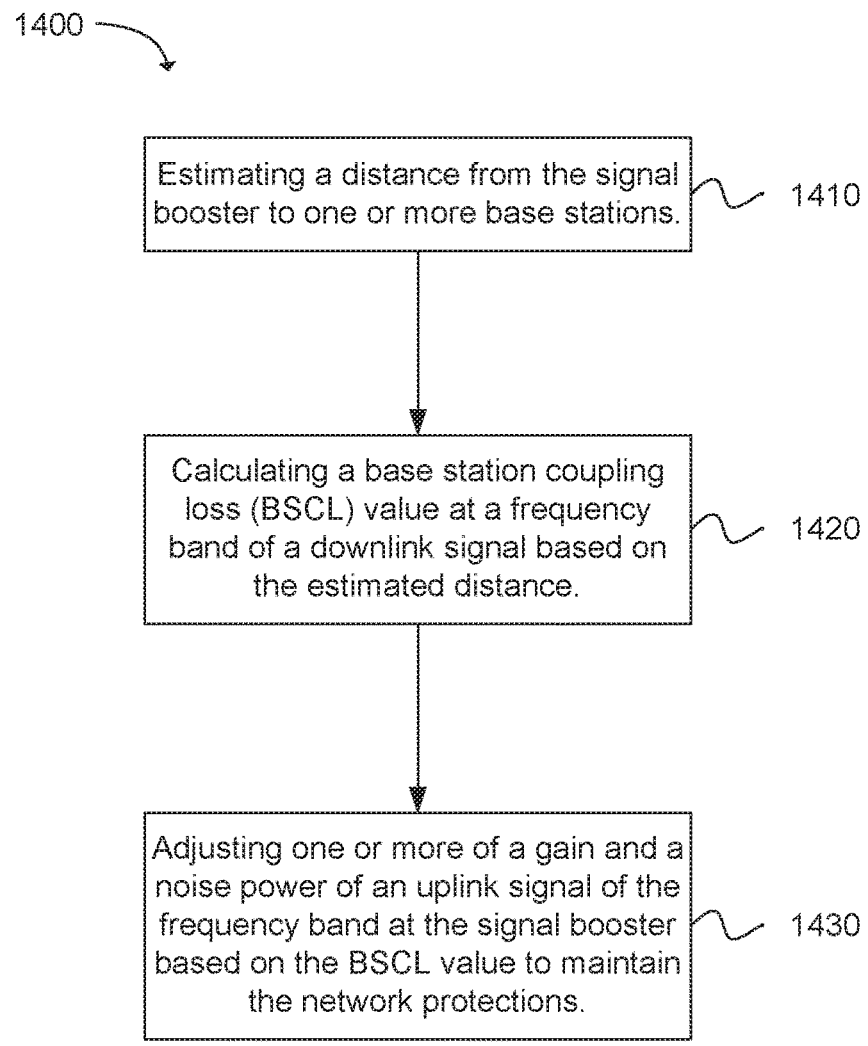
FIG. 14 depicts a flowchart of a method for increasing signal booster gain while maintaining network protections, in accordance with an example.

Another example provides functionality for increasing signal booster gain of a signal booster while maintaining network protections, as shown in the flow chart in FIG. 14. The functionality can be implemented as a method or the functionality can be executed as instructions on a machine, where the instructions are included on at least one computer readable medium or one non-transitory machine readable storage medium.

A method 1400 for increasing signal booster gain of a signal booster, while maintaining network protections, as illustrated in the flow chart of FIG. 14, comprises estimating a distance from the signal booster to one or more base stations, as shown in block 1410. The method further comprises calculating a base station coupling loss (BSCL) value at a frequency band of a downlink signal based on the estimated distance, as shown in block 1420. One or more of a gain and a noise power of an uplink signal of the frequency band can be adjusted at the signal booster based on the BSCL value, to maintain a network protection, as shown in block 1430.

The method 1400 can further comprise calculating the BSCL value of the downlink signal at one or more bands selected from third generation partnership project (3GPP) long term evolution (LTE) frequency bands: 2, 4, 5, 12, 13, 17, or 25. In another embodiment, the BSCL value of the downlink signal can be calculated at one or more bands selected from: third generation partnership project (3GPP) long term evolution (LTE) frequency division duplex (FDD) bands 1 through 33; or 3GPP LTE time division duplex (TDD) bands 34 through 44.

In one example, the operation of estimating the distance can further comprise: calculating the distance from the signal booster to the one or more base stations using a geographic coordinate system location of the signal booster and a geographic coordinate system location of the one or more base stations; or estimating the distance from the signal booster to the one or more base stations using a pilot signal timing; or estimating the distance from the signal booster to the one or more base stations based on the pilot signal timing and a difference in the geographic coordinate system location of the signal booster and the one or more base stations.

The method 1400 can further comprise estimating the distance from the signal booster to the one or more base stations using a pilot signal travel time between the base station and the signal booster.

The method 1400 can further comprise determining a source base station of a selected downlink signal received at the signal booster by comparing the calculated distance of the one or more base stations and the estimated distance of the selected downlink signal using the pilot signal timing to identify a substantially similar distance. For example, the distance to three different base stations may be calculated at 1 kilometer, 1.8 kilometers, and 500 meters. A signal received at the signal booster may have an estimated distance from its source base station (i.e. the base station it was transmitted from), using pilot signal timing, or another timing method, of 493 meters. It can be determined that the source base station of this signal is the base station that is approximately 500 meters from the signal booster. If the signal booster does not amplify any signals for uplink transmission to this base station, then the contribution of the selected signal to the BSCL can be eliminated or reduced through filtering. This can enable the uplink gain or noise power to be increased at the signal booster, while maintaining required network protections for the base stations.

The method 1400 can further comprise: determining a geographic location of the signal booster using a global positioning system; determining a geographic location of the one or more base stations using a global positioning system; and estimating the distance between the signal booster and the one or more base stations based on the determined geographic locations.

The method 1400 can further comprise: calculating the base station coupling loss (BSCL) value at the frequency band of the downlink signal over the estimated distance using an estimated loss per distance of a signal at the frequency band traveling through the earth's atmosphere.

In one embodiment, the base station coupling loss (BSCL) value can be calculated at the frequency band of the downlink signal based on a signal loss terrain model for a location of the signal booster and the one or more base stations. The signal loss terrain model can be for one or more of a country terrain, a flat terrain, a hilly terrain, a suburb terrain, a city terrain, a mountain terrain, a forest terrain, or a line of site terrain.

Figure 15:
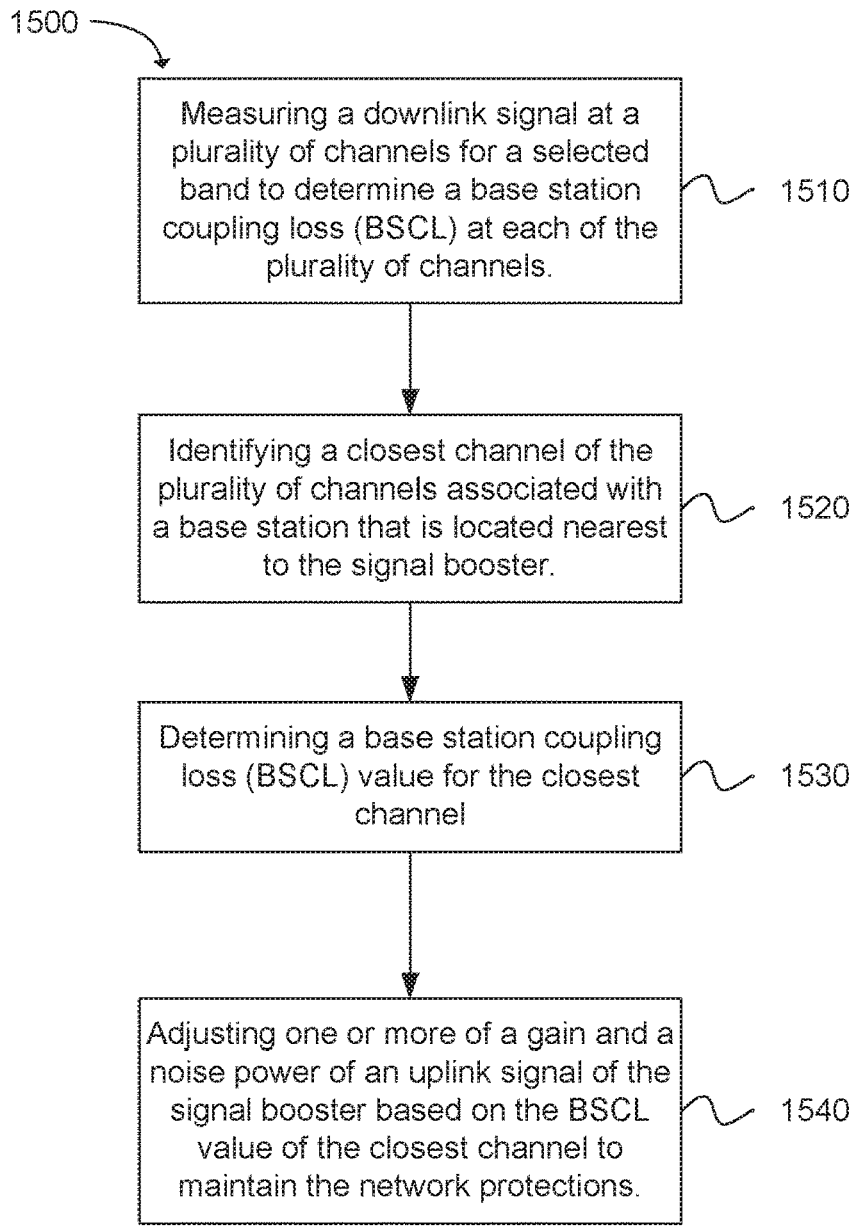
FIG. 15 depicts a flowchart of an additional method for increasing signal booster gain while maintaining network protections, in accordance with an example.

Another example provides functionality for increasing signal booster gain while maintaining network protections, as shown in the flow chart in FIG. 15. The functionality can be implemented as a method or the functionality can be executed as instructions on a machine, where the instructions are included on at least one computer readable medium or one non-transitory machine readable storage medium.

A method 1500 for increasing signal booster gain using channelization while maintaining network protections, as illustrated in the flow chart of FIG. 15, comprises measuring a downlink signal at a plurality of channels for a selected band to determine a base station coupling loss (BSCL) at each of the plurality of channels, as shown in block 1510. The method 1500 further comprises identifying a closest channel of the plurality of channels associated with a base station that is located nearest to the signal booster, as shown in block 1520. A base station coupling loss (BSCL) value can be determined for the closest channel, as shown in block 1530. The method 1500 further comprises adjusting one or more of a gain and a noise power of an uplink signal of the signal booster based on the BSCL value of the closest channel while maintaining an network protection, as shown in block 1540.

The method 1500 can further comprise measuring the downlink signal at the plurality of channels in one or more of third generation partnership project (3GPP) long term evolution (LTE) frequency bands: 2, 4, 5, 12, 13, 17, or 25. In another embodiment, the downlink signal can be measured at the plurality of channels in one or more bands selected from: third generation partnership project (3GPP) long term evolution (LTE) frequency division duplex (FDD) bands 1 through 33; or 3GPP LTE time division duplex (TDD) bands 34 through 44.

The method 1500 can further comprise identifying the closest channel of the plurality of channels that is associated with the base station that is located nearest to the signal booster by determining a signal with a highest received signal strength indicator (RSSI) as the closest channel.

The method 1500 can further comprise using a comb filter to receive the plurality of channels to enable delayed versions of each channel to be combined to determine the signal with the highest RSSI.

The method 1500 can further comprise removing a BSCL contribution of one or more signals broadcast in the plurality of channels from a broadband BSCL value of the downlink signal based on one of a frequency range of the plurality of channels and a BSCL value of each of the plurality of channels.

Figure 16:
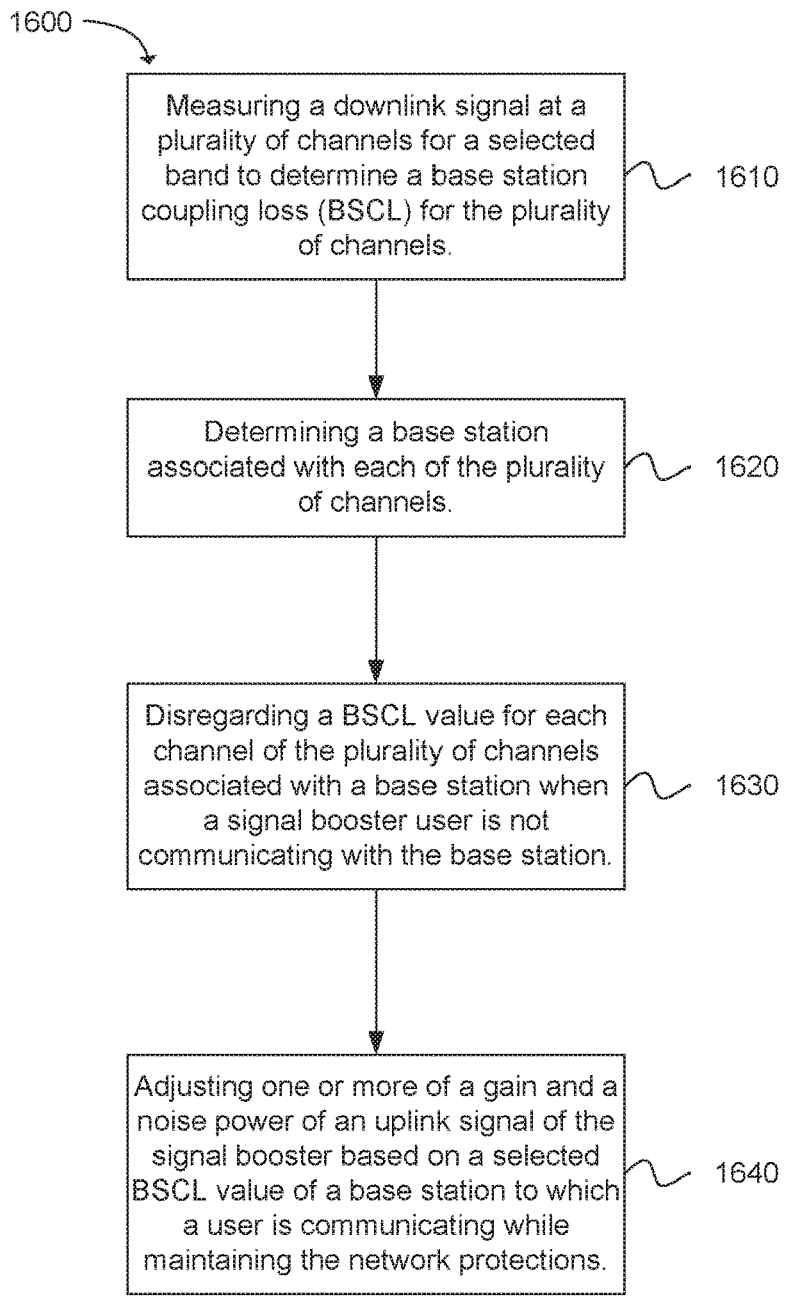
FIG. 16 depicts a flowchart of instructions for a machine readable storage medium having the instructions embodied thereon for increasing signal booster gain while maintaining network protections in accordance with an example.

Another example provides functionality for increasing signal booster gain using channelization, while maintaining network protections, as shown in the flow chart in FIG. 16.

The functionality can be implemented as a method or the functionality can be executed as instructions 1600 on a machine, where the instructions are included on at least one computer readable medium or one non-transitory machine readable storage medium.

The instructions 1600, when executed by one or more processors at a channelization device or a channelized signal booster, perform the following: measuring a downlink signal at a plurality of channels for a selected band to determine a base station coupling loss (BSCL) for the plurality of channels, as shown in block 1610; determining a base station associated with each of the plurality of channels, as shown in block 1620; disregarding a BSCL value for each channel of the plurality of channels associated with a base station when a signal booster user is not communicating with the base station, as shown in block 1630; and adjusting one or more of a gain and a noise power of an uplink signal of the signal booster based on a selected BSCL value of a base station to which a user is communicating while maintaining the network protections, as shown in block 1640.

The instructions 1600, when executed by one or more processors, can further perform: measuring the downlink signal at the plurality of channels in one or more of third generation partnership project (3GPP) long term evolution (LTE) frequency bands: 2, 4, 5, 12, 13, 17, or 25.

The instructions 1600, when executed by one or more processors, can further perform: measuring the downlink signal at the plurality of channels in one or more bands selected from: third generation partnership project (3GPP) long term evolution (LTE) frequency division duplex (FDD) bands 1 through 33; or 3GPP LTE time division duplex (TDD) bands 34 through 44.

The instructions 1600, when executed by one or more processors, can further perform: adjusting one or more of the gain and the noise power of the uplink signal of the signal booster based on the selected BSCL value, wherein the selected BSCL value is a lowest BSCL value of a base station to which one or more users are communicating.

The instructions 1600, when executed by one or more processors, can further perform: measuring a broadband downlink signal at the signal booster to determine a broadband base station coupling loss (BSCL) at the signal booster; adjusting the broadband BSCL based on the disregarded BSCL value of each channel of the plurality of channels associated with a base station when a signal booster user is not communicating with the base station; and setting an uplink gain value of the signal booster based on the adjusted broadband BSCL. Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for increasing signal booster gain while maintaining network protections using channelization, comprising:
   measuring a downlink signal at a plurality of channels for a selected band to determine a base station coupling loss (BSCL) at each of the plurality of channels;
   identifying a channel of the plurality of channels associated with a base station that is located nearest to the signal booster by determining a signal with a highest received signal strength indicator (RSSI) as the channel;
   using a comb filter to receive the plurality of channels to enable delayed versions of each channel to be combined to determine the signal with the highest RSSI;
   determining a base station coupling loss (BSCL) value for the channel of the plurality of channels; and
   adjusting one or more of a gain and a noise power of an uplink signal of the signal booster based on the BSCL value of the channel to maintain the network protections.

2. The method of claim 1, further comprising adjusting one or more of the gain and the noise power of an uplink signal of the signal booster based on the BSCL value of the channel when the BSCL value for the channel is less than a threshold value.

3. The method of claim 1, further comprising measuring the downlink signal at the plurality of channels in one or more of third generation partnership project (3GPP) long term evolution (LTE) frequency bands: 2, 4, 5, 12, 13, 17, or 25.

4. The method of claim 1, further comprising measuring the downlink signal at the plurality of channels in one or more bands selected from:
   third generation partnership project (3GPP) long term evolution (LTE) frequency division duplex (FDD) bands 1 through 33; or
   3GPP LTE time division duplex (TDD) bands 34 through 44.

5. The method of claim 1, further comprising removing a BSCL contribution of one or more signals broadcast in the plurality of channels from a broadband BSCL value of the downlink signal based on one of a frequency range of the plurality of channels and a BSCL value of each of the plurality of channels.

6. At least one non-transitory machine readable storage medium having instructions embodied thereon for increasing signal booster gain using channelization while maintaining network protections, the instructions when executed by one or more processors, at a channelization device or at a signal booster, perform the following:
   down converting a received downlink signal using a channelized filter to enable channelization of the downlink signal for maintaining network protections;
   measuring the downlink signal at a plurality of channels for a selected band to determine a base station coupling loss (BSCL) for the plurality of channels;
   determining a base station associated with each of the plurality of channels;
   disregarding a BSCL value for each channel of the plurality of channels associated with a base station when a signal booster user is not communicating with the base station; and
   adjusting a noise power of an uplink signal of the signal booster based on a selected BSCL value of a base station to which the signal booster user is communicating while maintaining the network protections.

7. The at least one non-transitory machine readable storage medium of claim 6, further comprising instructions that, when executed, perform the following: measuring the downlink signal at the plurality of channels in one or more of third generation partnership project (3GPP) long term evolution (LTE) frequency bands: 2, 4, 5, 12, 13, 17, or 25.

8. The at least one non-transitory machine readable storage medium of claim 6, further comprising instructions that, when executed, perform the following:
   measuring the downlink signal at the plurality of channels in one or more bands selected from:
   third generation partnership project (3GPP) long term evolution (LTE) frequency division duplex (FDD) bands 1 through 33; or
   3GPP LTE time division duplex (TDD) bands 34 through 44.

9. The at least one non-transitory machine readable storage medium of claim 6, further comprising instructions that, when executed, perform the following: adjusting the noise power of the uplink signal of the signal booster based on the selected BSCL value which is a lowest BSCL value of a base station to which one or more users are communicating.

10. The at least one non-transitory machine readable storage medium of claim 6, further comprising instructions that, when executed, perform the following:
measuring a broadband downlink signal at the signal booster to determine a broadband base station coupling loss (BSCL) at the signal booster;
adjusting the broadband BSCL based on the disregarded BSCL value of each channel of the plurality of channels associated with a base station when a signal booster user is not communicating with the base station; and
setting an uplink gain value of the signal booster based on the adjusted broadband BSCL.

11. The at least one non-transitory machine readable storage medium of claim 6, further comprising instructions that, when executed, perform the following: adjusting a gain of the uplink signal of the signal booster based on the selected BSCL value of the base station to which the user is communicating while maintaining the network protections.

12. A method for increasing signal booster gain using channelization at a signal booster while maintaining network protections, comprising:
measuring a downlink signal at a plurality of channels for a selected frequency band to determine a base station coupling loss (BSCL) value for the plurality of channels in the selected frequency band;
determining one or more base stations associated with each of the plurality of channels;
disregarding a channelized BSCL value for each channel of the plurality of channels that is associated with one or more unused base station of the one or more base stations, wherein an unused base station is a base station in which a signal booster user is not communicating with the unused base station of the one or more base stations; and
adjusting a noise power of an uplink signal of the signal booster based one or more selected channelized BSCL values of a used base station of the one or more base stations, wherein a used base station is a base station in which the signal booster user is communicating while maintaining the network protections.

13. The method of claim 12, further comprising: measuring the downlink signal at the plurality of channels in one or more of third generation partnership project (3GPP) long term evolution (LTE) frequency bands: 2, 4, 5, 12, 13, 17, or 25.

14. The method of claim 12, further comprising:
measuring the downlink signal at the plurality of channels in one or more bands selected from:
third generation partnership project (3GPP) long term evolution (LTE) frequency division duplex (FDD) bands 1 through 33; or
3GPP LTE time division duplex (TDD) bands 34 through 44.

15. The method of claim 12, further comprising: adjusting the noise power of the uplink signal of the signal booster based on a minimum BSCL value of the one or more selected channelized BSCL values, wherein the minimum BSCL value is a lowest BSCL value of a used base station to which one or more users are communicating.

16. The method of claim 12, further comprising:
measuring a broadband downlink signal at the signal booster to determine a broadband base station coupling loss (BSCL) value at the signal booster;
adjusting the broadband BSCL value based on the disregarded channelized BSCL value of each channel of the plurality of channels that is associated with an used base station when the signal booster user is not communicating with the unused base station; and
setting an uplink gain value of the signal booster based on the adjusted broadband BSCL value.

17. The method of claim 12, further comprising: adjusting a gain of the uplink signal of the signal booster based on the one or more selected channelized BSCL values of the used base station to which the user is communicating while maintaining the network protections.

* * * * *